United States Patent
Yamamoto et al.

(10) Patent No.: US 9,062,221 B2
(45) Date of Patent: Jun. 23, 2015

(54) POLYMER, INK AND ORGANIC FILM

(71) Applicants: Satoshi Yamamoto, Kanagawa (JP); Daisuke Goto, Fukuoka (JP); Satoshi Miyagawa, Kanagawa (JP)

(72) Inventors: Satoshi Yamamoto, Kanagawa (JP); Daisuke Goto, Fukuoka (JP); Satoshi Miyagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 73 days.

(21) Appl. No.: 13/798,819

(22) Filed: Mar. 13, 2013

(65) Prior Publication Data
US 2013/0253131 A1    Sep. 26, 2013

(30) Foreign Application Priority Data

Mar. 22, 2012 (JP) ................................. 2012-064760

(51) Int. Cl.
| | | |
|---|---|---|
| *H01L 29/08* | (2006.01) | |
| *C09D 5/24* | (2006.01) | |
| *C09D 11/108* | (2014.01) | |
| *C08G 61/10* | (2006.01) | |
| *C09D 11/52* | (2014.01) | |

(52) U.S. Cl.
CPC ............... *C09D 5/24* (2013.01); *C09D 11/108* (2013.01); *C08G 61/10* (2013.01); *C09D 11/52* (2013.01); *C08G 2261/1414* (2013.01); *C08G 2261/1426* (2013.01); *C08G 2261/148* (2013.01); *C08G 2261/312* (2013.01); *C08G 2261/412* (2013.01); *C08G 2261/414* (2013.01); *C08G 2261/5222* (2013.01); *C08G 2261/92* (2013.01); *C08G 2261/95* (2013.01)

(58) Field of Classification Search
None
See application file for complete search history.

(56) References Cited

U.S. PATENT DOCUMENTS

| | | | |
|---|---|---|---|
| 5,227,457 A | 7/1993 | Marrocco, III et al. | |
| 5,777,070 A | 7/1998 | Inbasekaran et al. | |
| 6,713,564 B1 | 3/2004 | Nobuhara et al. | |
| 7,166,689 B2 | 1/2007 | Sagisaka et al. | |
| 7,816,674 B2 | 10/2010 | Kato et al. | |
| 2007/0092760 A1 | 4/2007 | Sagisaka et al. | |
| 2009/0206329 A1 | 8/2009 | Yamaga et al. | |
| 2009/0230386 A1 | 9/2009 | Yamamoto et al. | |
| 2010/0219405 A1 | 9/2010 | Sagisaka et al. | |
| 2010/0279460 A1 | 11/2010 | Yamaga et al. | |
| 2011/0040107 A1 | 2/2011 | Goto et al. | |
| 2012/0119195 A1 | 5/2012 | Sagisaka et al. | |
| 2012/0153271 A1 | 6/2012 | Goto et al. | |

FOREIGN PATENT DOCUMENTS

| | | |
|---|---|---|
| JP | 09-241355 | 9/1997 |
| JP | 3009691 | 12/1999 |
| JP | 3078011 | 6/2000 |
| JP | 3103138 | 8/2000 |
| JP | 3733527 | 10/2005 |
| JP | 2010-001494 | 1/2010 |
| JP | 2010-255008 | 11/2010 |
| WO | WO89/07617 | 8/1989 |
| WO | WO 2011-030918 | * 3/2011 |

OTHER PUBLICATIONS

L.W Shacklette et al. Electrical and Optical Properties of Highly Conducting Charge-Transfer Complexes of Poly(p-Phenylene)*, Synthetic Metals,. vol. 1. 1979, p. 307-320.
"Electroconductive polymer", Kyoritsu Shuppan Co., Ltd., (Partial English Translation) 6 pages.
"Polymer Battery", Kyoritsu Shuppan Co., Ltd., ( Partial English Translation) 5 pages.
Takakazu Yamamoto et al. "Vacuum-Deposited Thin Film of Linear πConjugated Poly(arylene)s. Optical, Electrochemical, and Electrical Propertes and Molecular Alignment", J. Phys. Chem. vol. 100, 1996 p. 12631-12637.
Gabriele Grem et al. Realization of a Blue-Light-Emmitting Device using Poly(p-phenylene)**, Advanced Materials, vol. 4,1992, p. 36-37.
Journal of Materials Research. vol. 13, No. 7, 1998 p. 2023-2030.
Takakazu Yamamoto et al. "Soluble Copolymers of p-Phenylene and m-Phenylene. Their Basic Properties", Chemistry Letters,2000,p. 720-721.

* cited by examiner

*Primary Examiner* — Susannah Chung
*Assistant Examiner* — Robert T Butcher
(74) *Attorney, Agent, or Firm* — Oblon, McClelland, Maier & Neustadt, L.L.P.

(57) ABSTRACT

A polymer including: a polyaryl backbone; and an organic side-chain group including a partial structure represented by the following General Formula (I) or (II).

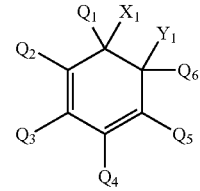

General Formula (I)

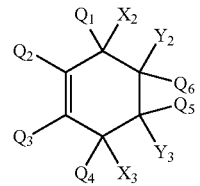

General Formula (II)

11 Claims, 2 Drawing Sheets

POLYMER, INK AND ORGANIC FILM

BACKGROUND OF THE INVENTION

1. Field of the Invention

The present invention relates to a polymer, an ink and an organic film.

2. Description of the Related Art

Polyphenylene is a substance which has heat-resistance and exhibits electroconductivity when an oxidizing agent (electron acceptor) and a reducing agent (electron donor) are added (see Synthetic Metals, Vol. 1., p. 307 (1987); "Electro-conductive polymer", KYORITSU SHUPPAN CO., LTD., p. 4; and "Polymer Battery", KYORITSU SHUPPAN CO., LTD., p. 15). In addition, many findings regarding the polyphenylene have been reported. For example, it is reported that the polyphenylene exhibits electroluminescence; the polyphenylene exhibits electrochromism and, therefore, is electrochemically active; and the polyphenylene can be carbonized (e.g., baked) to thereby obtain carbon material (see J. Phys. Chem. Vol. 100, p. 12631 (1996); Advanced Materials, Vol. 4, p. 36; and J. Mater. Res. Vol. 13, p. 2023).

Unfortunately, unmodified polyphenylene is, however, insoluble in a solvent and cannot be thermally melted. Accordingly, the unmodified polyphenylene is difficult to be molded and is incapable of being thinned. For that reason, various attempts have been made to solubilize the polyphenylene. For example, it is reported that a soluble polyphenylene can be obtained by polymerizing phenylenes having different binding sites such as polyphenylene and paraphenylene (see Japanese Patent (JP-B) No. 3733527, and Chem. Lett., 721 (2000)). However, the above method cannot confer satisfactory solubility on the resultant polyphenylene. Additionally, the resultant polyphenylene has a low degree of polymerization and unsatisfactory film-forming property. On the other hand, an attempt has been made to obtain a soluble and meltable polyphenylene by polymerizing monomers in which, for example, a long-chain alkyl or alkoxy group is introduced. For a polyphenylene-based polymer in which aromatic rings are added to a backbone thereof, a similar method has been also used for obtaining solubility and meltability. There has been disclosed that a polyphenylene-based polymer which is soluble in an organic solvent and is moldable can be obtained by polymerizing 1,4-dialkylbenzene compounds (see JP-B No. 3103138).

Thus, although various methods have been disclosed, most of them include introducing a dissolvable group such as an alkyl group and an alkoxy group into a side-chain (see JP-B No. 3078011). They are not suitable for obtaining heat stability, electron transport property and luminescence property, which are physical properties due to inherent properties of the polyphenylene such as stiffness and π electron-rich property. There has been no disclosure that clearly describes a method for conferring solubility on the polyphenylene while keeping a stiff structure thereof. Generally, the dissolvable group (bulk group) tends to inhibit electroconductivity. Therefore, solubility and electroconductivity are difficult to be achieved together.

A stiff polyphenylene polymer which has been made to be soluble by introducing a suitable dissolvable group, and thus can be thinned is expected to be utilized as a member for organic electronics, in particular, a semiconductor member, a conductor member, an electroluminescence member, an electrochromism member or an engineering plastic member.

SUMMARY OF THE INVENTION

The present invention aims to solve the above existing problems and achieve the following objects. That is, an object of the present invention is to provide a polymer which is soluble in an organic solvent and is capable of being formed into a thin-film.

Means for solving the above problems are as follows.

That is, a polymer of the present invention contains a polyaryl backbone and an organic side-chain group containing a partial structure represented by the following General Formula (I) or (II).

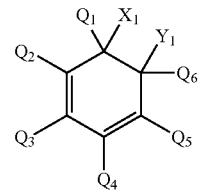

General Formula (I)

In General Formula (I), one of $X_1$ and $Y_1$ represents an alkoxy group which may have a substituent, or an acyloxy group which may have a substituent, and the other represents a hydrogen atom; $Q_1$ to $Q_6$ each independently represent a hydrogen atom, a halogen atom, a monovalent organic group, or a bond to a carbon atom or a nitrogen atom in an adjacent aryl ring; and adjacent groups among $Q_1$ to $Q_6$ may be linked together to form a part of a ring or be annelated to an adjacent benzene ring.

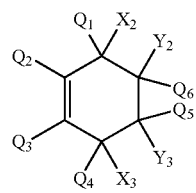

General Formula (II)

In General Formula (II), one of $X_2$ and $Y_2$ represents an alkoxy group which may have a substituent, or an acyloxy group which may have a substituent, and the other represents a hydrogen atom; one of $X_3$ and $Y_3$ represents an alkoxy group which may have a substituent, or an acyloxy group which may have a substituent, and the other represents a hydrogen atom; $Q_1$ to $Q_6$ each independently represent a hydrogen atom, a halogen atom, a monovalent organic group, or a bond to a carbon atom or a nitrogen atom in an adjacent aryl ring; and adjacent groups among $Q_1$ to $Q_6$ may be linked together to form a part of a ring or be annelated to an adjacent benzene ring.

The present invention can solve the above existing problems and achieve the above objects; and can provide a polymer which is soluble in an organic solvent and is capable of being formed into a thin-film.

DETAILED DESCRIPTION OF THE INVENTION (Polymer)

Figure 1:
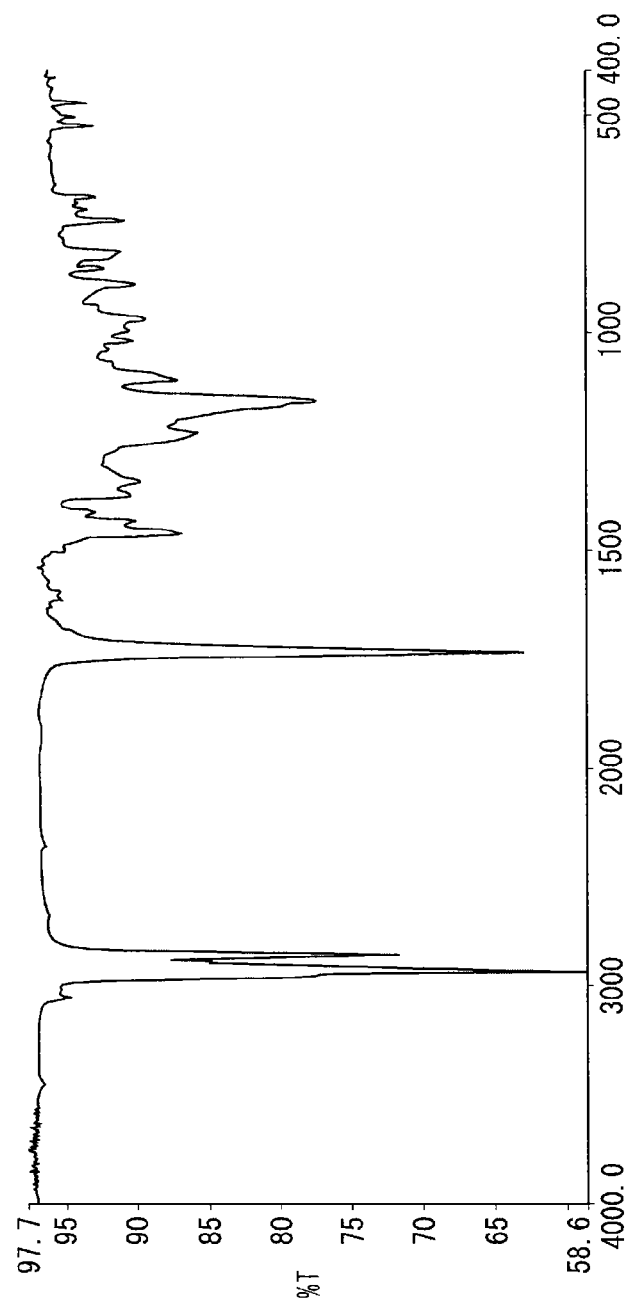
FIG. 1 is an infrared absorption spectrum of Polymer 2 obtained in Example 2.

A polymer of the present invention has a polyaryl backbone and an organic side-chain group including a partial structure represented by the following General Formula (I) or (II).

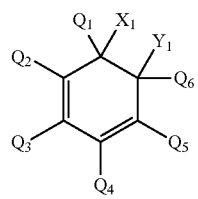

General Formula (I)

In General Formula (I), one of $X_1$ and $Y_1$ represents an alkoxy group which may have a substituent, or an acyloxy group which may have a substituent, and the other represents a hydrogen atom; $Q_1$ to $Q_6$ each independently represent a hydrogen atom, a halogen atom, a monovalent organic group, or a bond to a carbon atom or a nitrogen atom in an adjacent aryl ring; and adjacent groups among $Q_1$ to $Q_6$ may be linked together to form a part of a ring or be annelated to an adjacent benzene ring.

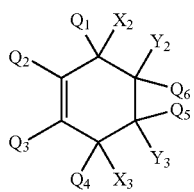

General Formula (II)

In General Formula (II), one of $X_2$ and $Y_2$ represents an alkoxy group which may have a substituent, or an acyloxy group which may have a substituent, and the other represents a hydrogen atom; one of $X_3$ and $Y_3$ represents an alkoxy group which may have a substituent, or an acyloxy group which may have a substituent, and the other represents a hydrogen atom; $Q_1$ to $Q_6$ each independently represent a hydrogen atom, a halogen atom, a monovalent organic group, or a bond to a carbon atom or a nitrogen atom in an adjacent aryl ring; and adjacent groups among $Q_1$ to $Q_6$ may be linked together to form a part of a ring or be annelated to an adjacent benzene ring.

The present inventors conducted extensive studies, and have found that having a certain partial structure can achieve a polymer having a high solubility together with a stiff structure.

In General Formulas (I) and (II), a group represented by $X_1$ to $X_3$ and $Y_1$ to $Y_3$ is a hydrogen atom, an alkoxy group which may have a substituent or an acyloxy group which may have a substituent; one of each pair of X and Y is an alkoxy group which may have a substituent or an acyloxy group which may have a substituent; and the other is a hydrogen atom.

Having the partial structure can confer a high solubility on a polymer having a stiff structure, and can achieve a high film-forming property. Introduction of the above specific partial structure can extend π conjugation and improve solubility unlike conventional dissolvable groups. Extension of π conjugation can be advantageous in electronic devices, especially in organic electronics members where electron transportation is important (e.g., semiconductive members, electroconductive members, electroluminescence members and electrochromism members).

Examples of the alkoxy group which may have a substituent include an alkoxy group derived from an alcohol (e.g., an optionally substituted linear or cyclic aliphatic alcohol and an aromatic alcohol). The alkoxy group which may have a substituent may include thioalkoxy groups in which oxygen atoms in the above ethers are replaced by sulfur atoms. Specific examples of the alkoxy group which may have a substituent include a methoxy group, an ethoxy group, a propoxy group, a butoxy group, an isobutoxy group, a pivaloyl group, a pentoxy group, a hexyoxy group, a lauryloxy group, a trifluoromethoxy group, a 3,3,3-trifluoropropoxy group, a pentafluoropropoxy group, a cyclopropoxy group, a cyclobutoxy group, a cyclohexyloxy group, a trimethylsilyloxy group, a triethylsilyloxy group, a tert-butyldimethylsilyloxy group, and a tert-butyldiphenylsilyloxy group. Further examples include thioalkoxy groups in which oxygen atoms in ether linkages of the above alkoxy groups are replaced by sulfur atoms.

Examples of the acyloxy group which may have a substituent include a formyloxy group; and an acyloxy group derived from a carboxylic acid (e.g., a linear or cyclic aliphatic carboxylic acid optionally containing a halogen atom and an aromatic carboxylic acid) and a carbonate half-ester thereof. The acyloxy group which may have a substituent may include acyloxy groups derived from thiocarboxylic acids in which oxygen atoms in the above carboxylic acids are replaced by sulfur atoms. Specific examples of the acyloxy group which may have a substituent include a formyloxy group, an acetoxy group, a propionyloxy group, a butyryloxy group, an isobutyryloxy group, a pivaloyloxy group, a pentanoyloxy group, a hexanoyloxy group, a lauroyloxy group, a stearoyloxy group, a trifluoroacetyloxy group, a 3,3,3-trifluoropropionyloxy group, a pentafluoropropionyloxy group, a cyclopropanoyloxy group, a cyclobutanoyloxy group, a cyclohexanoyloxy group, a benzoyloxy group, a p-methoxyphenylcarbonyloxy group, and a pentafluorobenzoyloxy group.

In addition, there may be exemplified carbonate esters derived from carbonate half-esters in which oxygen atoms or sulfur atoms are inserted between carbonyl groups and alkyl or aryl groups in the above-exemplified acyloxy groups. Moreover, further examples include acylthiooxy groups and thioacyloxy groups in which one or more oxygen atoms in the ether linkages and carbonyl moieties of the above acyloxy groups are replaced by sulfur atoms.

Some of specific examples of the groups represented by $X_1$ to $X_3$ and $Y_1$ to $Y_3$ are exemplified below.

TABLE 1-1

Examples of substituents X1 to X3 and Y1 to Y3 (1/10)

| | |
|---|---|
| 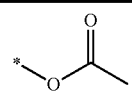 | No. 1 |
| 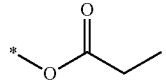 | No. 2 |

TABLE 1-1-continued
Examples of substituents X1 to X3 and Y1 to Y3 (1/10)
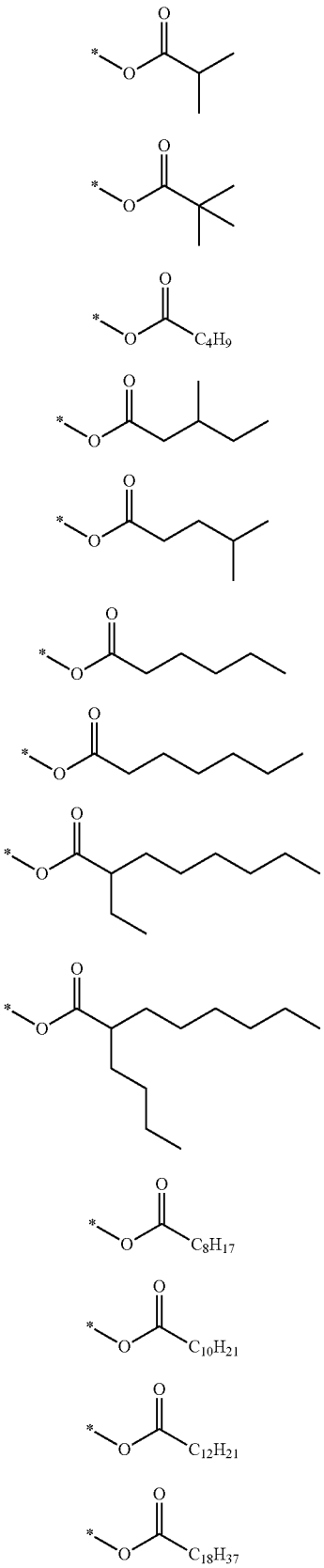
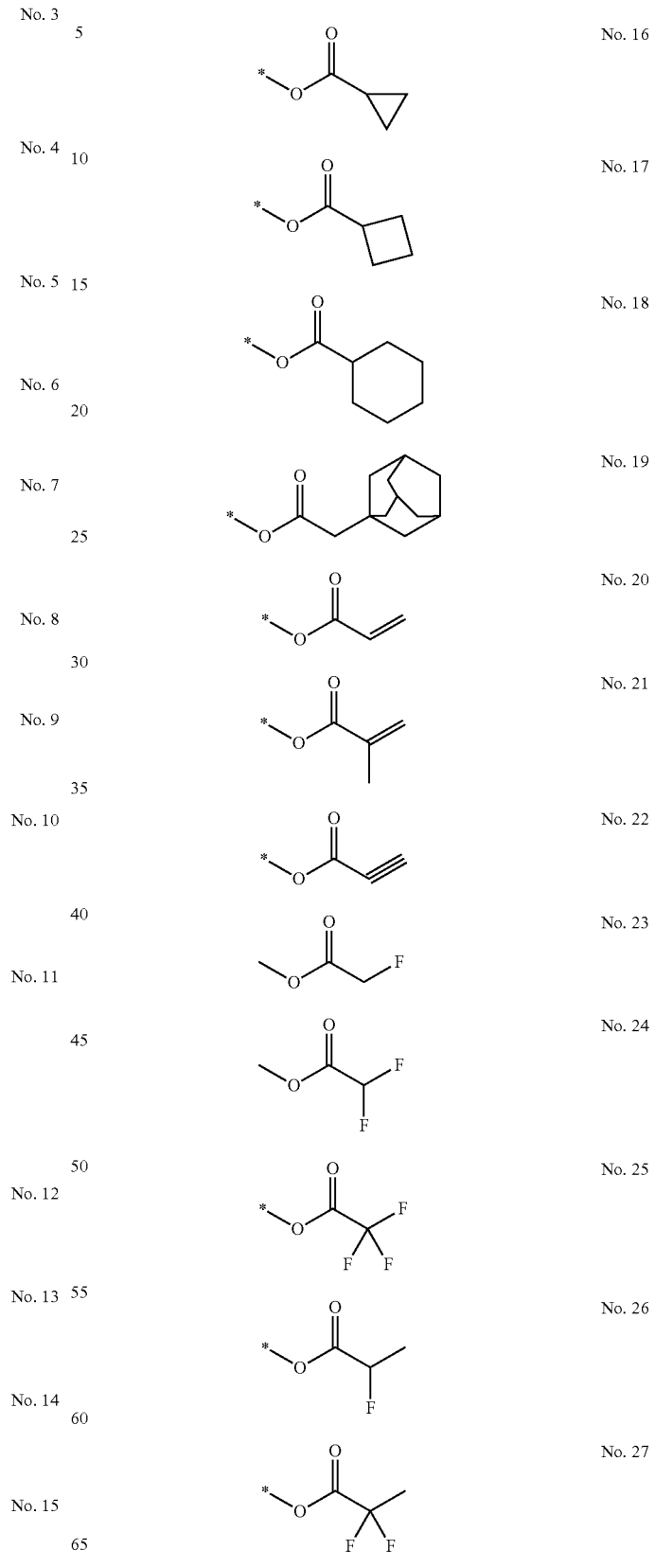

TABLE 1-1-continued
Examples of substituents X1 to X3 and Y1 to Y3 (1/10)
| Structure | No. |
|---|---|
| 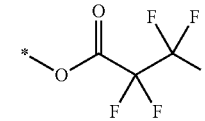 | No. 28 |
| 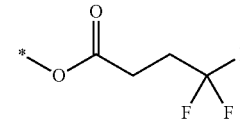 | No. 29 |
| 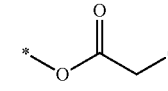 | No. 30 |
| 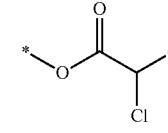 | No. 31 |
| 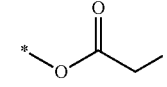 | No. 32 |
| 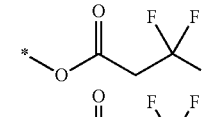 | No. 33 |
| 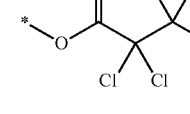 | No. 34 |
| 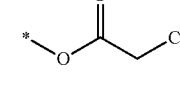 | No. 35 |
| 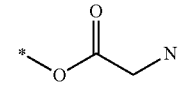 | No. 36 |
| 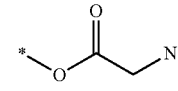 | No. 37 |
| 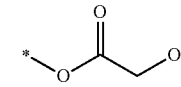 | No. 38 |
| 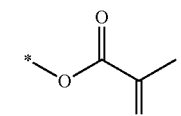 | No. 39 |
| 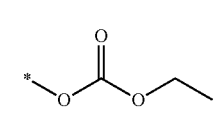 | No. 40 |
| 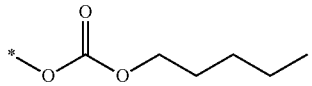 | No. 41 |
TABLE 1-1-continued
Examples of substituents X1 to X3 and Y1 to Y3 (1/10)
| Structure | No. |
|---|---|
| | No. 42 |
| | No. 43 |
| | No. 44 |
| | No. 45 |
| | No. 46 |
TABLE 1-2
Examples of substituents X1 to X3 and Y1 to Y3 (2/10)
| Structure | No. |
|---|---|
| | No. 47 |
| | No. 48 |
| | No. 49 |
| | No. 50 |
| | No. 51 |
| | No. 52 |

TABLE 1-2-continued
Examples of substituents X1 to X3 and Y1 to Y3 (2/10)
No. 53
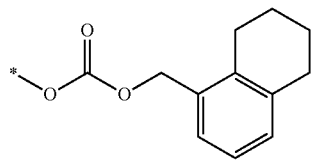
No. 54
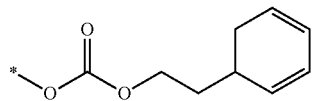
No. 55
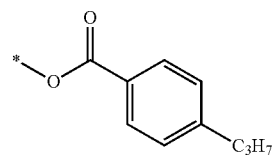
No. 56
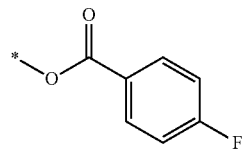
No. 57
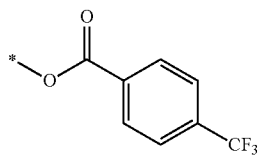
No. 58
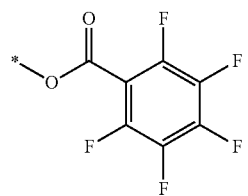
No. 59
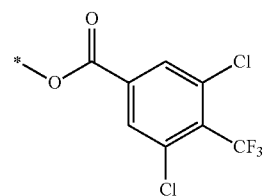
No. 60
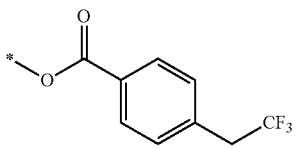
No. 61
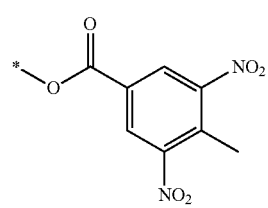
TABLE 1-2-continued
Examples of substituents X1 to X3 and Y1 to Y3 (2/10)
No. 62
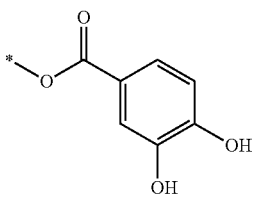
No. 63
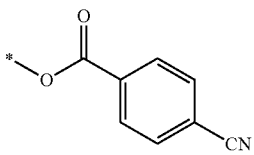
No. 64
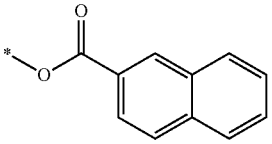
No. 65
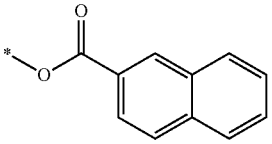
No. 66
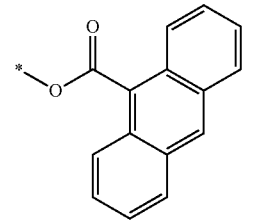
TABLE 1-3
Examples of substituents X1 to X3 and Y1 to Y3 (3/10)
No. 67
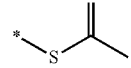
No. 68
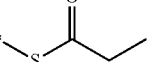
No. 69
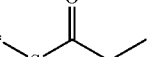
No. 70
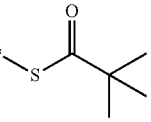

TABLE 1-3-continued
Examples of substituents X1 to X3 and Y1 to Y3 (3/10)
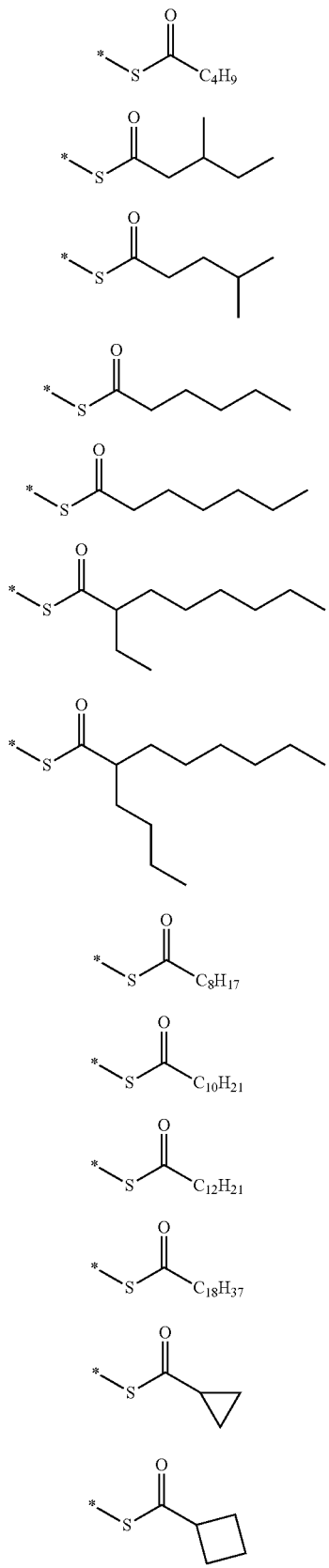
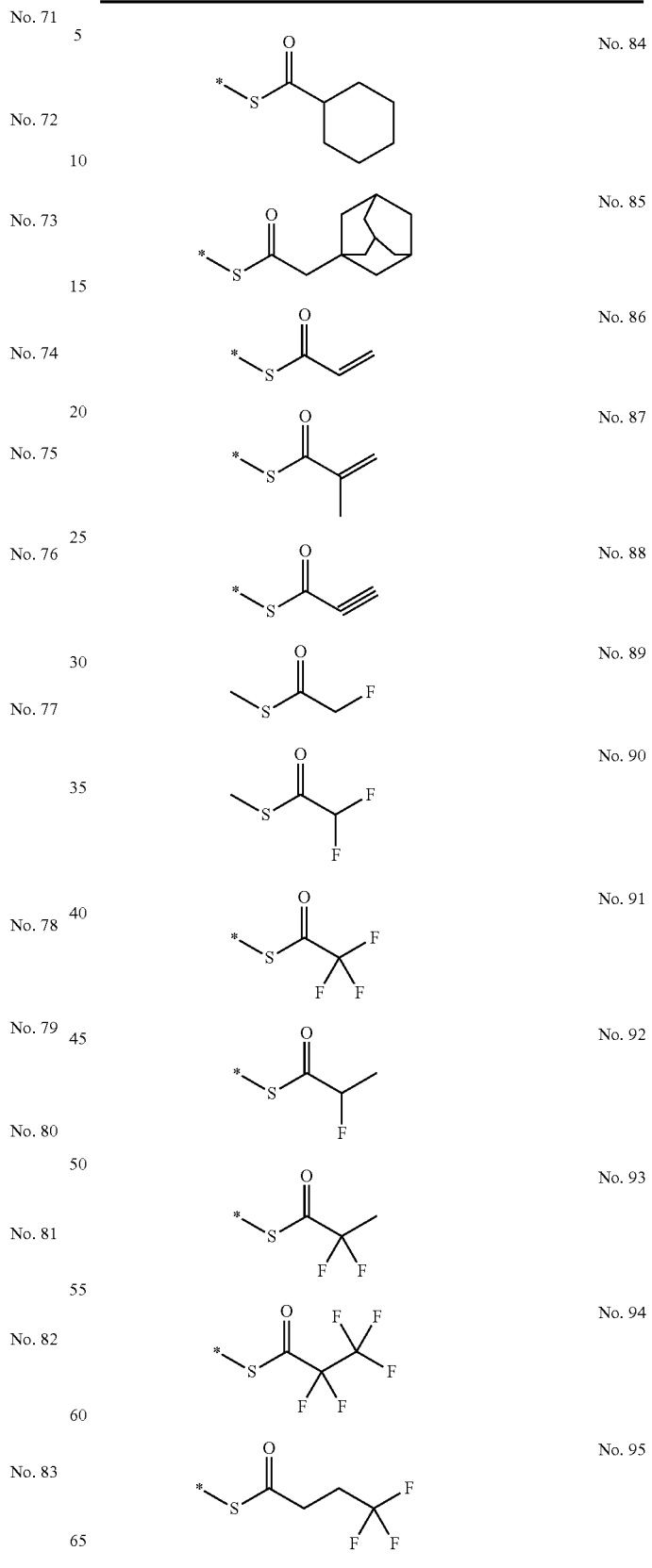

TABLE 1-3-continued
Examples of substituents X1 to X3 and Y1 to Y3 (3/10)
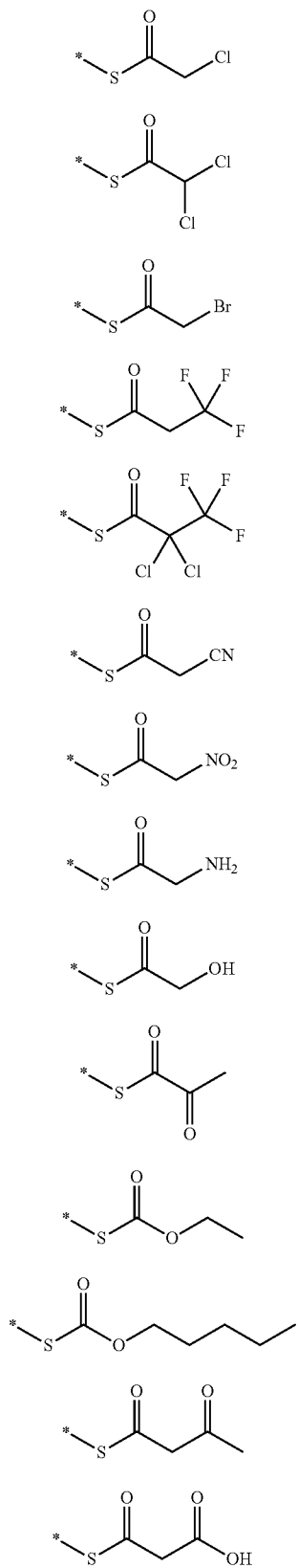
TABLE 1-3-continued
Examples of substituents X1 to X3 and Y1 to Y3 (3/10)
TABLE 1-4
Examples of substituents X1 to X3 and Y1 to Y3 (4/10)
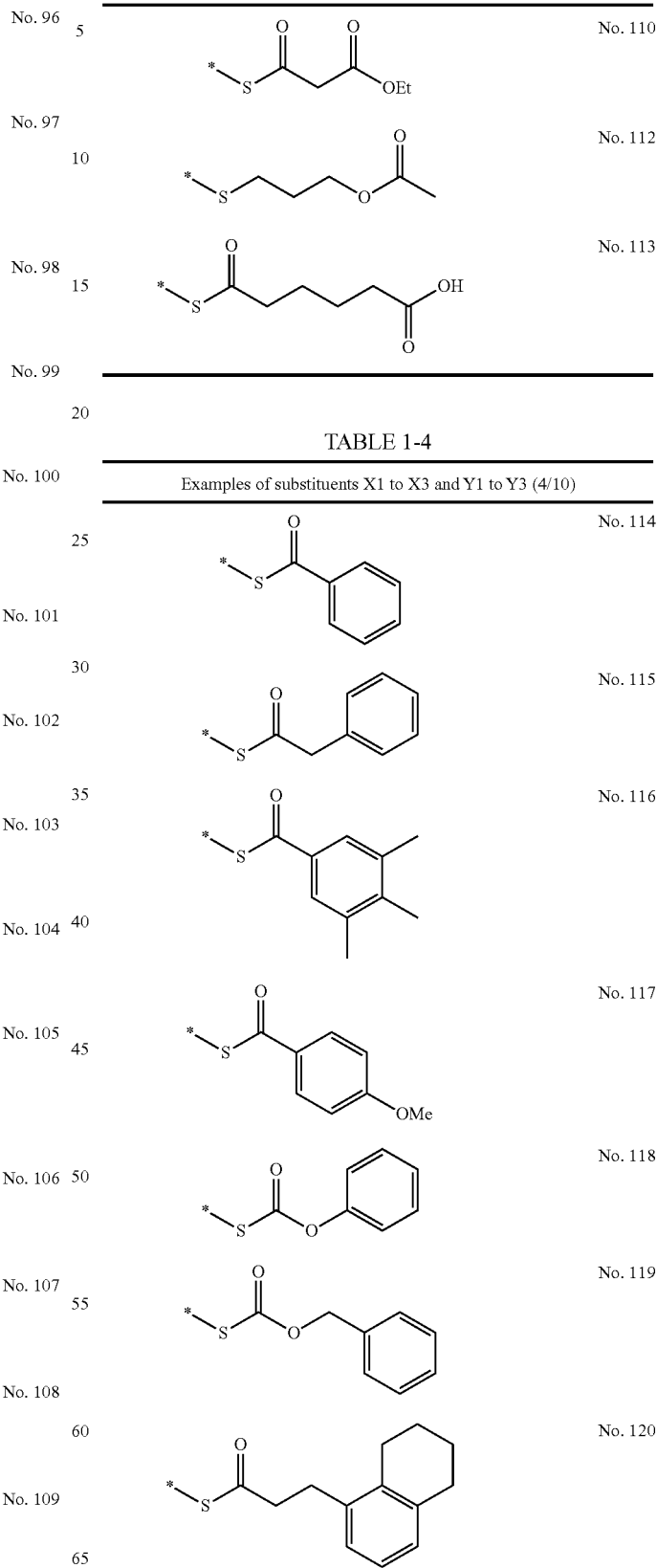

TABLE 1-4-continued
Examples of substituents X1 to X3 and Y1 to Y3 (4/10)
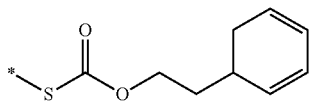 No. 121
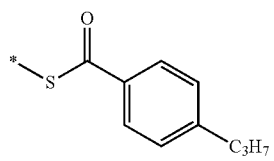 No. 122
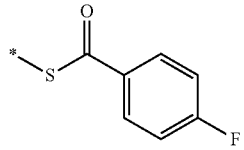 No. 123
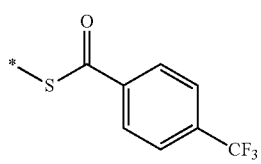 No. 124
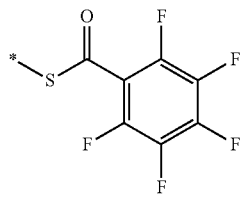 No. 125
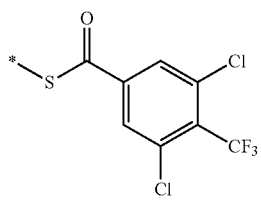 No. 126
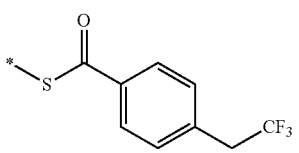 No. 127
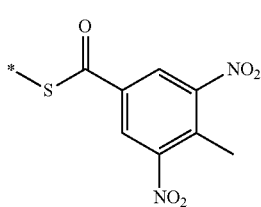 No. 128
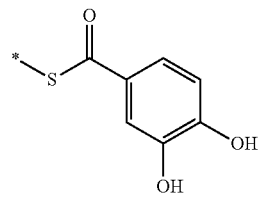 No. 129
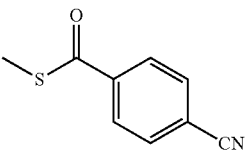 No. 130
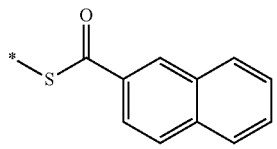 No. 131
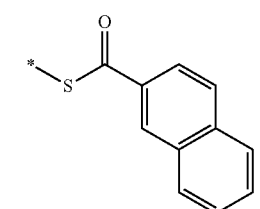 No. 132
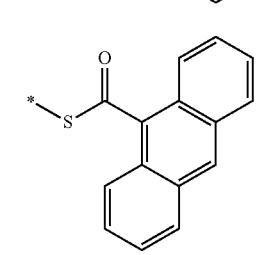 No. 133
TABLE 1-5
Examples of substituents X1 to X3 and Y1 to Y3 (5/10)
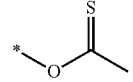 No. 134
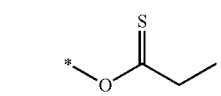 No. 135
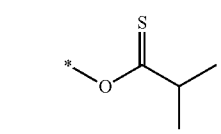 No. 136
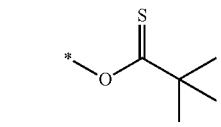 No. 137
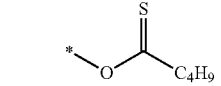 No. 138
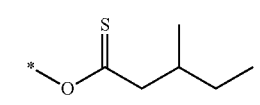 No. 139

TABLE 1-5-continued
Examples of substituents X1 to X3 and Y1 to Y3 (5/10)
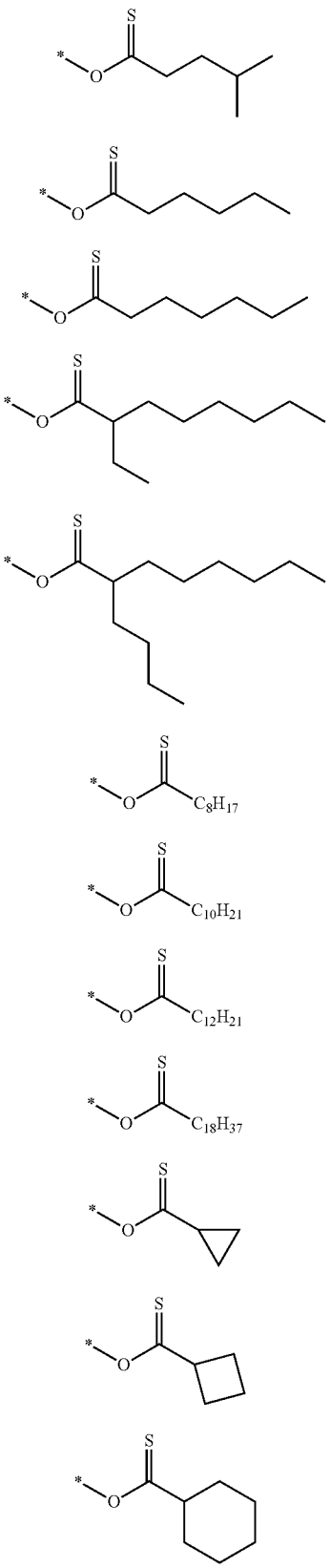
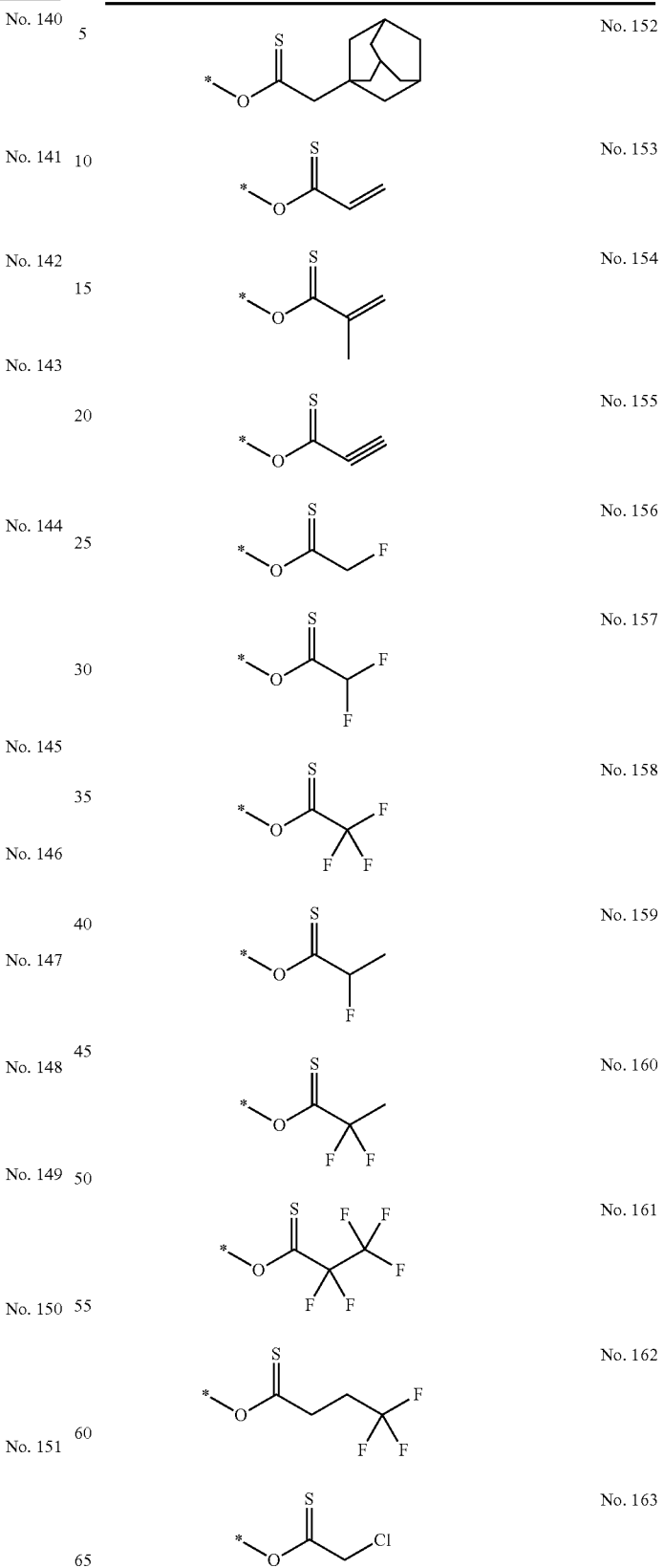

TABLE 1-5-continued
Examples of substituents X1 to X3 and Y1 to Y3 (5/10)
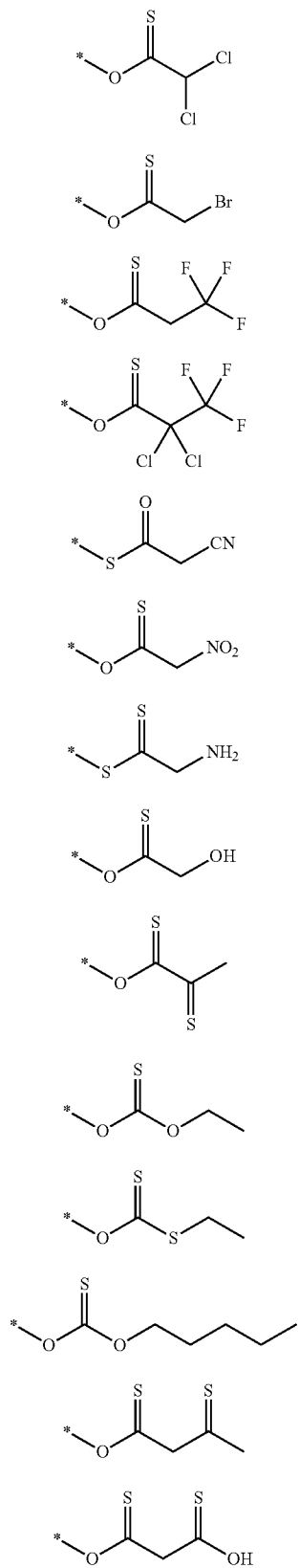
No. 164
No. 165
No. 166
No. 167
No. 168
No. 169
No. 170
No. 171
No. 172
No. 173
No. 174
No. 175
No. 176
No. 177
TABLE 1-5-continued
Examples of substituents X1 to X3 and Y1 to Y3 (5/10)
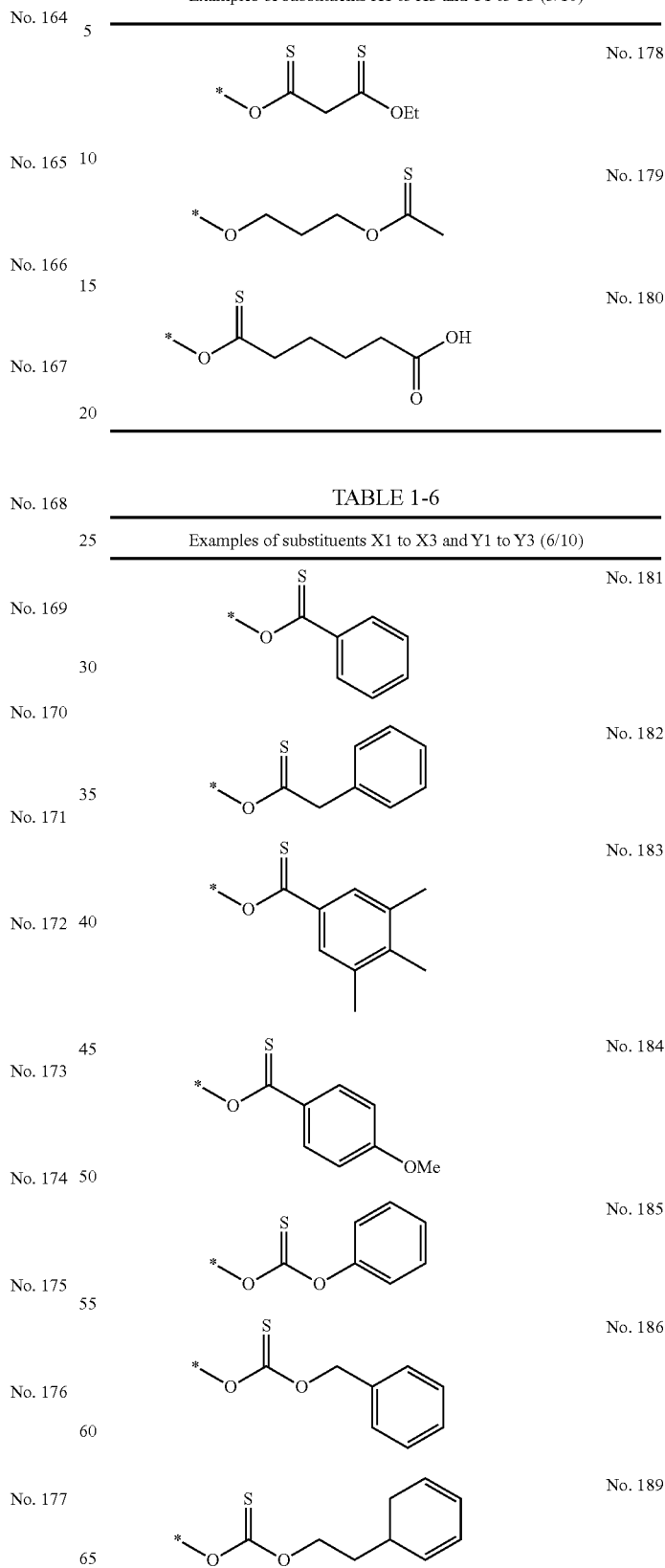
No. 178
No. 179
No. 180
TABLE 1-6
Examples of substituents X1 to X3 and Y1 to Y3 (6/10)
No. 181
No. 182
No. 183
No. 184
No. 185
No. 186
No. 189

TABLE 1-6-continued
Examples of substituents X1 to X3 and Y1 to Y3 (6/10)
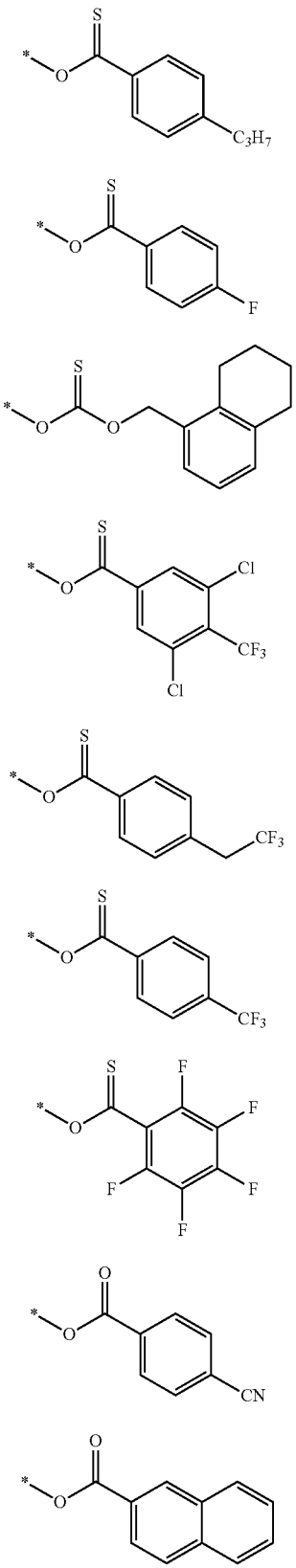
No. 190
No. 191
No. 192
No. 193
No. 194
No. 195
No. 196
No. 197
No. 198
TABLE 1-6-continued
Examples of substituents X1 to X3 and Y1 to Y3 (6/10)
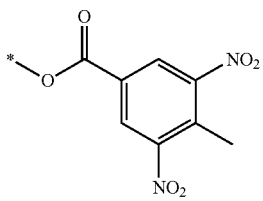
No. 199
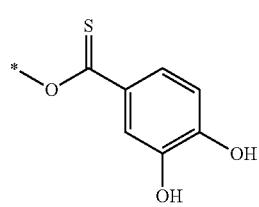
No. 200
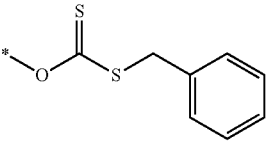
No. 201
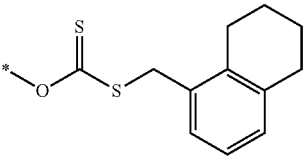
No. 202
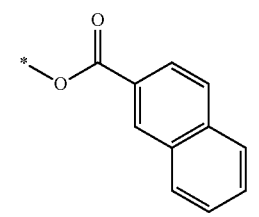
No. 203
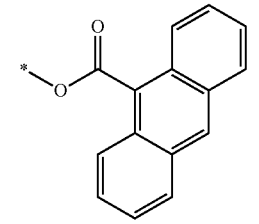
No. 204
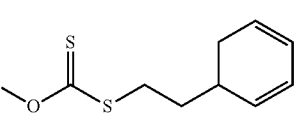
No. 205
TABLE 1-7
Examples of substituents X1 to X3 and Y1 to Y3 (7/10)
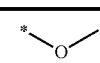
No. 206
No. 207

TABLE 1-7-continued
Examples of substituents X1 to X3 and Y1 to Y3 (7/10)
| Structure | No. |
|---|---|
| 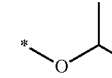 | No. 208 |
| 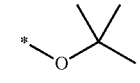 | No. 209 |
| 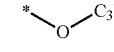 *—O—C₃H₇ | No. 210 |
| 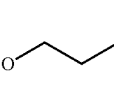 | No. 211 |
| 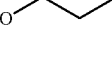 | No. 212 |
| 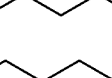 | No. 213 |
| 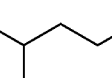 | No. 214 |
| 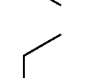 | No. 215 |
| 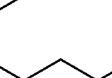 | No. 216 |
| 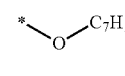 *—O—C₇H₁₅ | No. 217 |
| 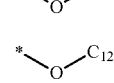 *—O—C₁₀H₂₁ | No. 218 |
| 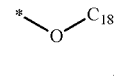 *—O—C₁₂H₂₅ | No. 219 |
| 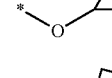 *—O—C₁₈H₃₇ | No. 220 |
| 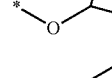 | No. 221 |
| 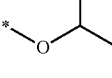 | No. 222 |
| 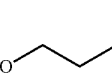 | No. 223 |
| 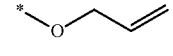 | No. 224 |
| 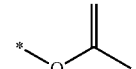 | No. 225 |
| 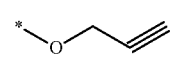 | No. 226 |
| 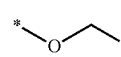 | No. 227 |
| 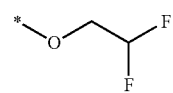 | No. 228 |
|  | No. 229 |
| 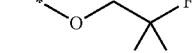 | No. 230 |
| 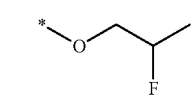 | No. 231 |
|  | No. 232 |
| 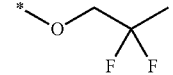 | No. 233 |
|  | No. 234 |
| 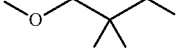 | No. 235 |
| 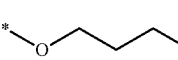 | No. 236 |
|  | No. 237 |
| 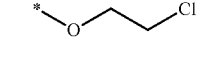 | No. 238 |
| 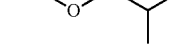 | No. 239 |
| 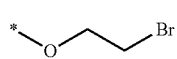 | No. 240 |
|  | No. 241 |
| 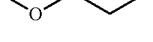 | No. 242 |
| | No. 243 |

TABLE 1-7-continued

Examples of substituents X1 to X3 and Y1 to Y3 (7/10)

| Structure | No. |
|---|---|
| *–O–CH₂–C(=O)–CH₃ | No. 244 |
| *–O–CH₂–O–CH₂CH₃ | No. 245 |
| *–O–CH₂–O–C₅H₁₁ | No. 246 |
| *–O–(CH₂)₃–OH | No. 247 |
| *–O–CH₂CH₂–C(=O)–OEt | No. 248 |
| *–O–CH₂CH₂–O–Et | No. 249 |
| *–O–(CH₂)₄–C(=O)–OH | No. 250 |

TABLE 1-8

Examples of substituents X1 to X3 and Y1 to Y3 (8/10)

| Structure | No. |
|---|---|
| *–S–CH₃ | No. 251 |
| *–S–C₂H₅ | No. 252 |
| *–S–CH(CH₃)₂ | No. 253 |
| *–S–C(CH₃)₃ | No. 254 |
| *–S–C₃H₇ | No. 255 |
| *–S–CH₂CH₂–CH(CH₃)–C₂H₅ | No. 256 |
| *–S–(CH₂)₃–CH(CH₃)₂ | No. 257 |
| *–S–C₆H₁₃ | No. 258 |
| *–S–C₇H₁₅ | No. 259 |
| *–S–CH₂–CH(C₂H₅)–C₅H₁₁ | No. 260 |

TABLE 1-8-continued

Examples of substituents X1 to X3 and Y1 to Y3 (8/10)

| Structure | No. |
|---|---|
| *–S–CH(C₄H₉)(C₇H₁₅) | No. 261 |
| *–S–C₇H₁₅ | No. 262 |
| *–S–C₁₀H₂₁ | No. 263 |
| *–S–C₁₂H₂₅ | No. 264 |
| *–S–C₁₈H₃₇ | No. 265 |
| *–S–cyclopropyl | No. 266 |
| *–S–cyclobutyl | No. 267 |
| *–S–cyclohexyl | No. 268 |
| *–S–CH₂CH₂–adamantyl | No. 269 |
| *–S–CH=CH₂ | No. 270 |
| *–S–CH₂–CH=CH₂ | No. 271 |
| *–S–C(CH₃)=CH₂ | No. 272 |
| *–S–CH₂–C≡CH | No. 273 |
| *–S–CH₂F | No. 274 |
| *–S–CH₂–CHF₂ | No. 275 |
| *–S–CH₂–CF₃ | No. 276 |
| *–S–CH₂–CHF–CH₃ | No. 277 |
| *–S–CH₂–CF₂–CH₃ | No. 278 |

TABLE 1-8-continued
Examples of substituents X1 to X3 and Y1 to Y3 (8/10)
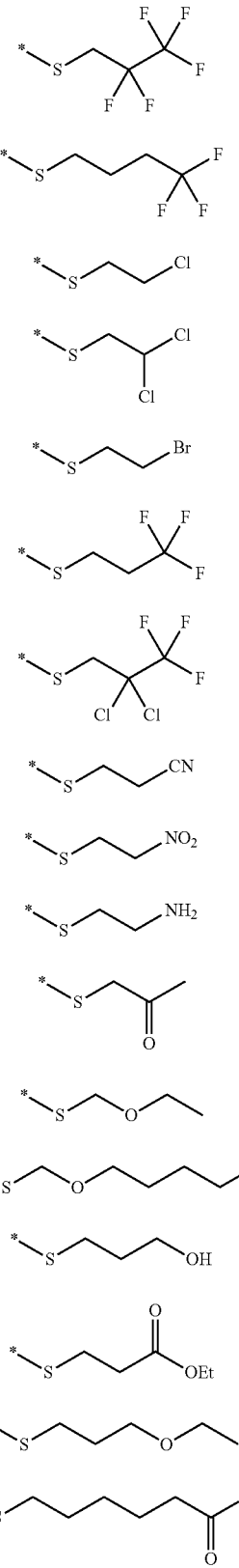
TABLE 1-9
Examples of substituents X1 to X3 and Y1 to Y3 (9/10)
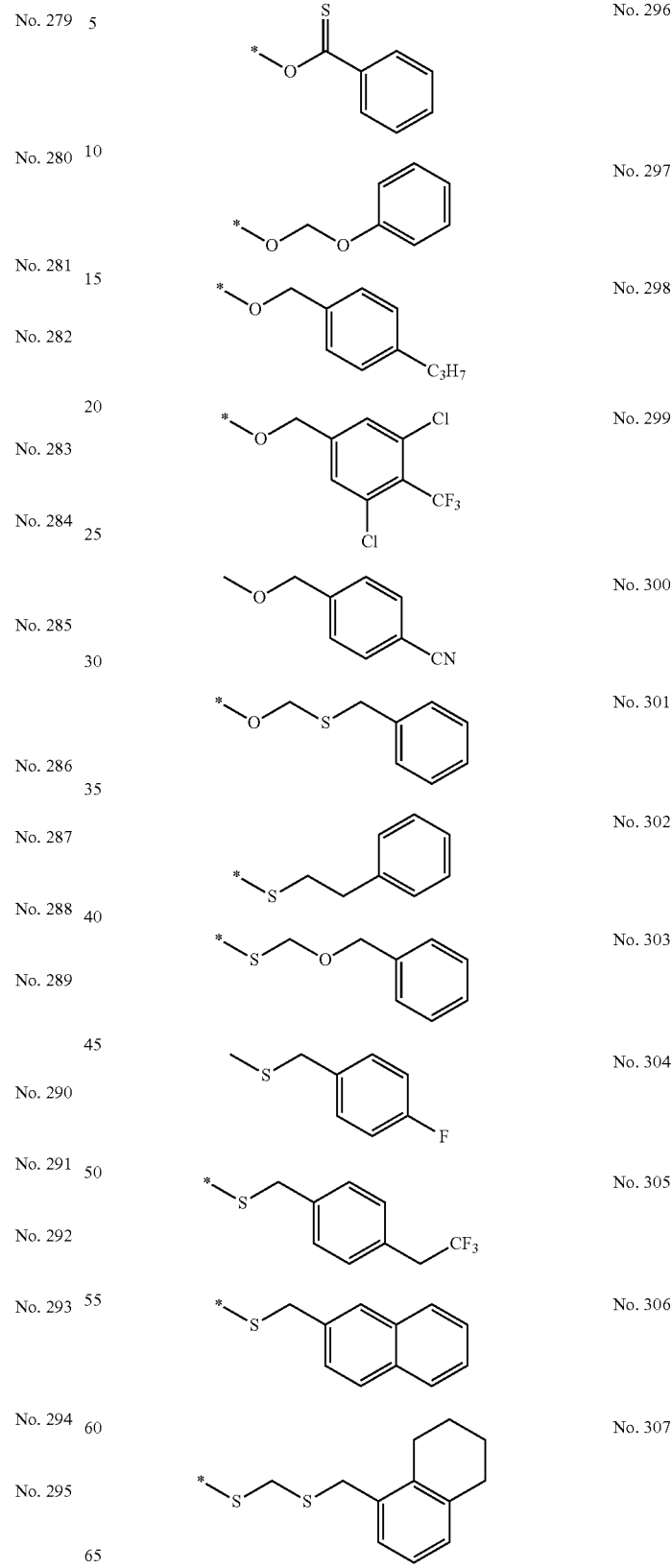

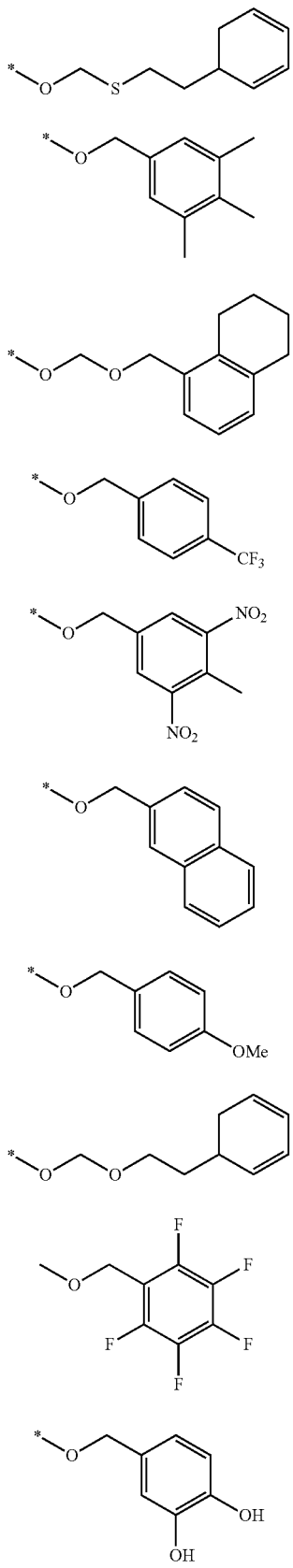
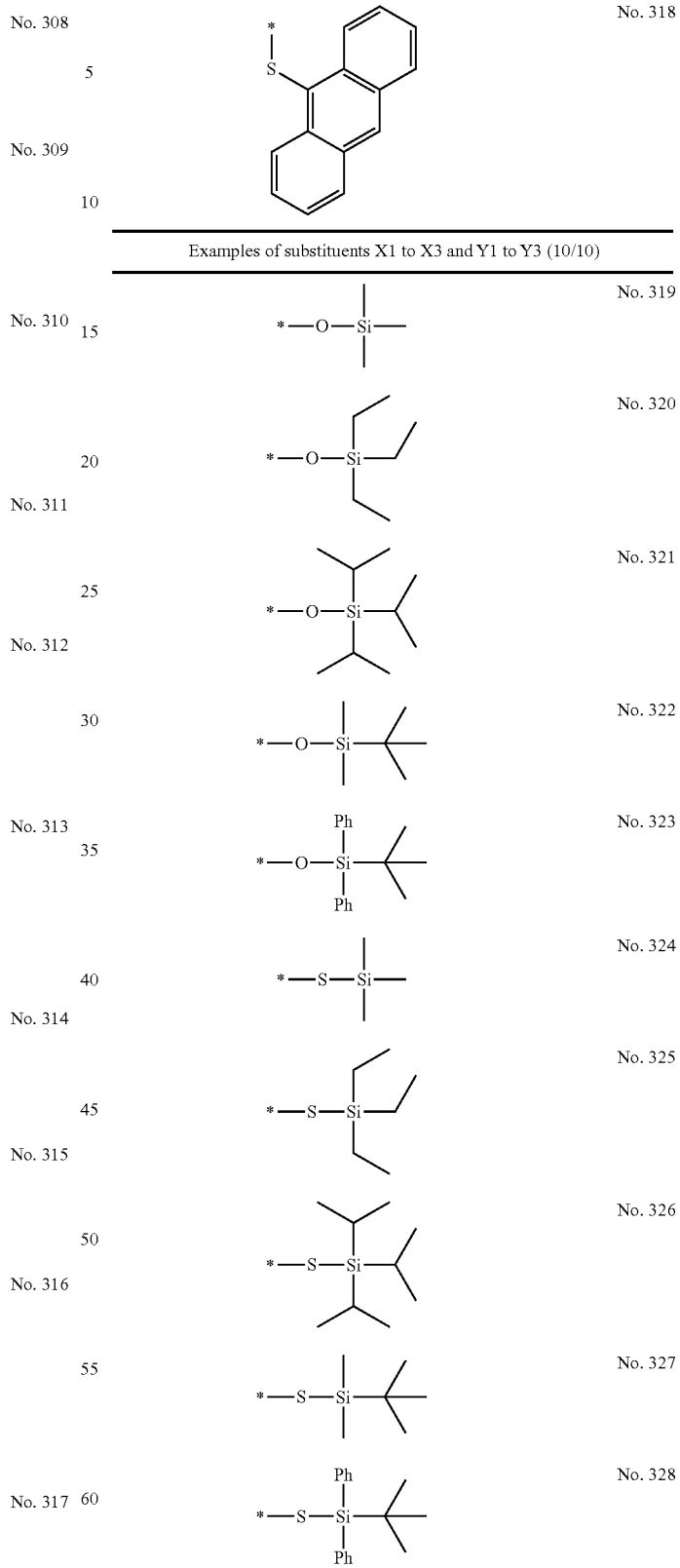
Examples of the groups represented by $Q_1$ to $Q_6$ include a hydrogen atom; a halogen atom (e.g., a fluorine atom, a chlorine atom, a bromine atom or an iodine atom); or a monovalent organic group (provided that $Q_1$ to $Q_6$ are monovalent organic groups other than an alkoxy group which may have a substituent or an acyloxy group which may have a substituent). Alternatively, $Q_1$ to $Q_6$ may represent bonds to a carbon atom or a nitrogen atom in an adjacent aryl ring; and adjacent groups among $Q_1$ to $Q_6$ may be linked together to form a part of a ring or be annelated to an adjacent benzene ring.

Examples of the monovalent organic group include an alkyl group, an alkenyl group, an alkynyl group, an aryl group, a heteroaryl group, an alkoxyl group, a thioalkoxyl group, an aryloxy group, a thioaryloxy group, a heteroaryloxy group, a heteroarylthiooxy group, a cyano group, a hydroxyl group, a nitro group, a carboxyl group, a thiol group and an amino group.

The alkyl group means a linear or branched or cyclic, substituted or unsubstituted alkyl group.

Examples of the linear or branched alkyl group include a methyl group, an ethyl group, an n-propyl group, an i-propyl group, a t-butyl group, a s-butyl group, an n-butyl group, an i-butyl group, a pentyl group, a hexyl group, a heptyl group, an octyl group, a nonyl group, a decyl group, an undecyl group, a dodecyl group, a tridecyl group, a tetradecyl group, a pentadecane group, a hexadecyl group, a heptadecyl group, an octadecyl group, a 3,7-dimethyloctyl group, a 2-ethyl-hexyl group, a trifluoromethyl group, a trifluorooctyl group, a trifluorododecyl group, a trifluorooctadecyl group and 2-cyanoethyl group.

Examples of the cyclic alkyl group (cycloalkyl group) include a cyclopentyl group, a cyclobutyl group, a cyclohexyl group and a pentafluorocyclohexyl group.

An alkyl group in the below-explained other monovalent organic groups has the same meanings as defined above.

The alkenyl group means a linear or branched or cyclic, substituted or unsubstituted alkenyl group.

Examples of the linear or branched alkenyl group include the above-described alkyl groups having two or more carbon atoms in which any one or more carbon-carbon single bonds are replaced by double bonds. Specific examples of the linear or branched alkenyl group include an ethenyl group (vinyl group), a propenyl group (allyl group), a 1-butenyl group, a 2-butenyl group, a 2-methyl-2-butenyl group, a 1-pentenyl group, a 2-pentenyl group, a 3-pentenyl group, a 1-hexenyl group, a 2-hexenyl group, a 3-hexenyl group, a 1-heptenyl group, a 2-heptenyl group, a 3-heptenyl group, a 4-heptenyl group, a 1-octenyl group, a 2-octenyl group, a 3-octenyl group, a 4-octenyl group, a 1,1,1-trifluoro-2-butenyl group.

Examples of the cyclic alkenyl group (cycloalkenyl group) include the above-described cycloalkyl groups having three or more carbon atoms in which any one or more carbon-carbon single bonds are replaced by double bonds. Specific examples of the cyclic alkenyl group include a 1-cycloallyl group, a 1-cyclobutenyl group, a 1-cyclopentenyl group, a 2-cyclopentenyl group, a 3-cyclopentenyl group, a 1-cyclohexenyl group, a 2-cyclohexenyl group, a 3-cyclohexenyl group, a 1-cycloheptenyl group, a 2-cycloheptenyl group, a 3-cycloheptenyl group, a 4-cycloheptenyl group and a 3-fluoro-1-cyclohexenyl group.

Notably, the alkenyl group may be, if present, any stereoisomer such as a trans (E) isomer or a cis (Z) isomer, or a mixture thereof at any ratio.

Examples of the alkynyl group include the above-described alkyl group having two or more carbon atoms in which any one or more carbon-carbon single bonds are replaced by triple bonds. Examples of such alkynyl group include an ethynyl group, a propargyl group, a trimethylsilylethynyl group and a triisopropylsilylethynyl group.

Examples of the aryl group include a phenyl group, an o-tolyl group, an m-tolyl group, a p-tolyl group, a p-chlorophenyl group, a p-fluorophenyl group, a p-trifluorophenyl group and a naphthyl group.

Examples of the heteroaryl group include a 2-furyl group, a 2-thienyl group, a 3-thienyl group, a 2-thienothienyl group, a 2-benzothienyl group and a 2-pyrimidyl group.

Specific examples of the alkoxyl group and the thioalkoxyl group include alkoxyl groups and thioalkoxyl groups in which oxygen atoms or sulfur atoms are inserted into linkage positions in the above-exemplified alkyl groups and alkenyl groups and alkynyl groups.

Specific examples of the aryloxy group and the thioaryloxy group include aryloxy groups and groups in which oxygen atoms or sulfur atoms are inserted into linkage positions in the above-exemplified aryl groups.

Specific examples of the heteroaryloxy group and the heterothioaryloxy group include heteroaryloxy groups and heterothioaryloxy groups in which oxygen atoms or sulfur atoms are inserted into linkage positions in the above-exemplified heteroaryl groups.

Examples of the amino group include an amino group ($-NH_2$), a substituted or unsubstituted alkylamino group (e.g., a methylamino group and a dimethylamino group), a substituted or unsubstituted anilino group (e.g., an anilino group and an N-methyl-anilino group), a diphenylamino group, a acylamino group [e.g., a formylamino group, a substituted or unsubstituted alkylcarbonylamino group (e.g., acetylamino group, a pivaloylamino group and a lauroylamino group), a substituted or unsubstituted arylcarbonylamino group (e.g., a benzoylamino group, a 3,4,5-tri-n-octyloxyphenylcarbonylamino group)], an aminocarbonylamino group (e.g., a carbon-substituted or unsubstituted aminocarbonylamino group such as a carbamoyl group, a N,N-dimethylaminocarbonylamino group, a N,N-diethylaminocarbonylamino group and a morpholinocarbonylamino group).

The monovalent organic groups represented by $Q_1$ to $Q_6$ may be those described above. Among them, the monovalent organic groups are preferably aryl or heteroaryl groups which may have a substituent; or alternatively adjacent groups among $Q_1$ to $Q_6$ form a ring structure together with each other. More preferably, the ring structure is formed of aryl or heteroaryl groups which may have a substituent.

Examples of the ring structure (bond or annelation mode of the ring) include the following structures. Notably, in the following structural formulas, one of X and Y represents the alkoxy group which may have a substituent, or the acyloxy group which may have a substituent, and the other represents a hydrogen atom.

TABLE 2

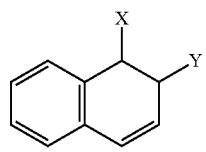

C-(1)

TABLE 2-continued
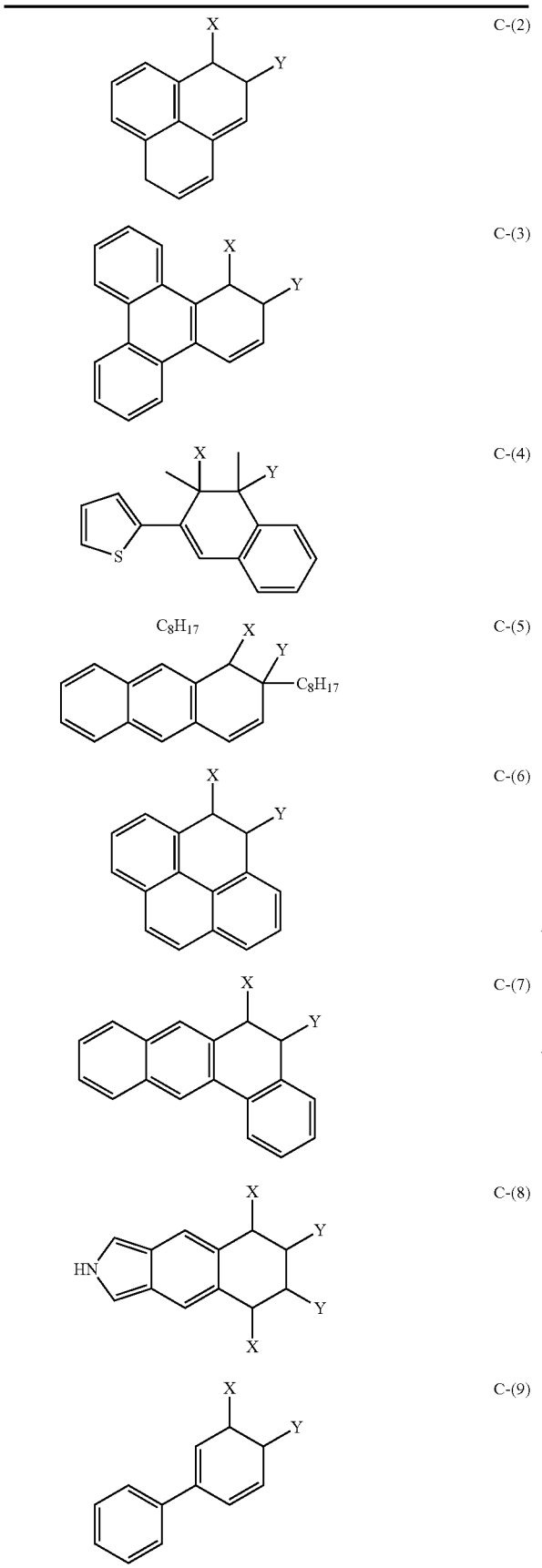
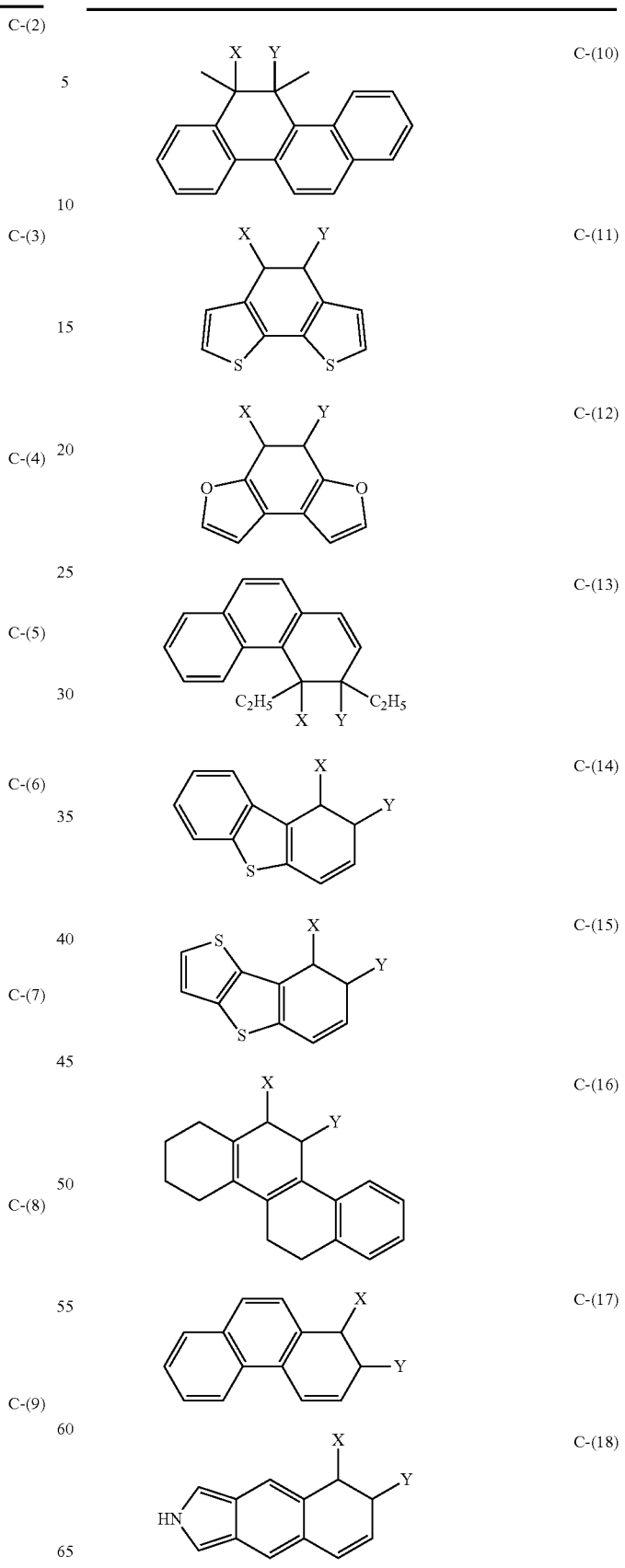

TABLE 2-continued

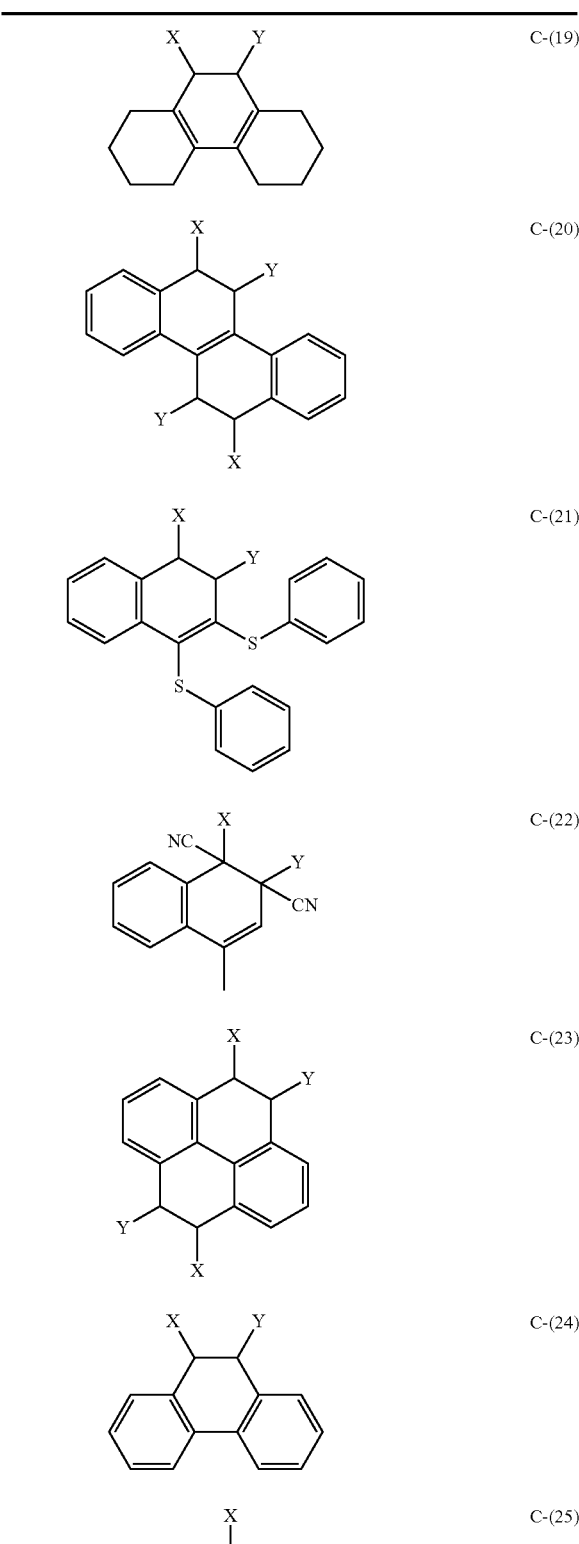

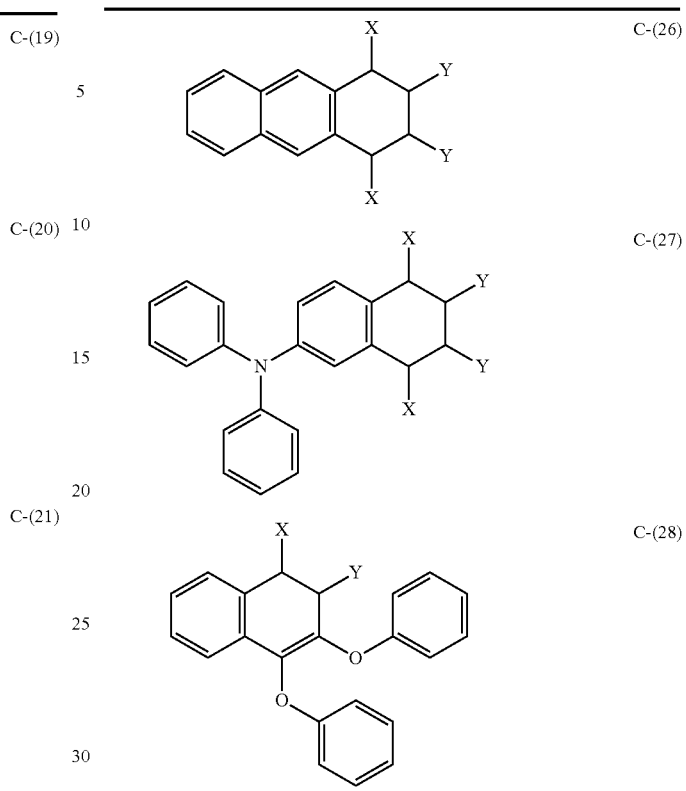

In addition, there will be described examples in which any of $Q_1$ to $Q_6$ in General Formula (I) or (II) is a bond to a carbon atom or a nitrogen atom in an adjacent aryl ring. However, these examples are intended for explaining the present invention and the present invention is not limited thereto.

In the case where any of $Q_1$ to $Q_6$ is a bond to a carbon atom or a nitrogen atom in an adjacent aryl ring, examples of the partial structure represented by General Formula (I) or (II) include an aromatic group having a bond to a carbon atom or a nitrogen atom in an adjacent aryl ring such as a cyclohexenyl group [the following General Formula (1-11)], a cyclohexadienyl group [the following General Formula (1-21)], a benzocyclohexenyl group [the following General Formula (1-12) or (1-13)], a benzocyclohexadienyl group [the following General Formula (1-22)], an indolino[2,3]cyclohexenyl group [the following General Formula (1-14), (1-15) or (1-16)], or indolino[2,3]hexadienyl group [the following General Formula (1-23), (1-24) or (1-25)].

TABLE 3-2

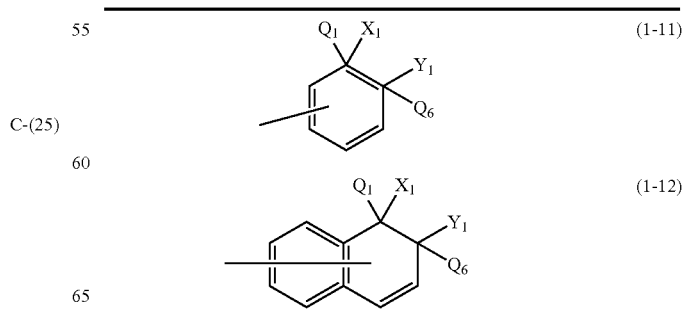

TABLE 3-2-continued

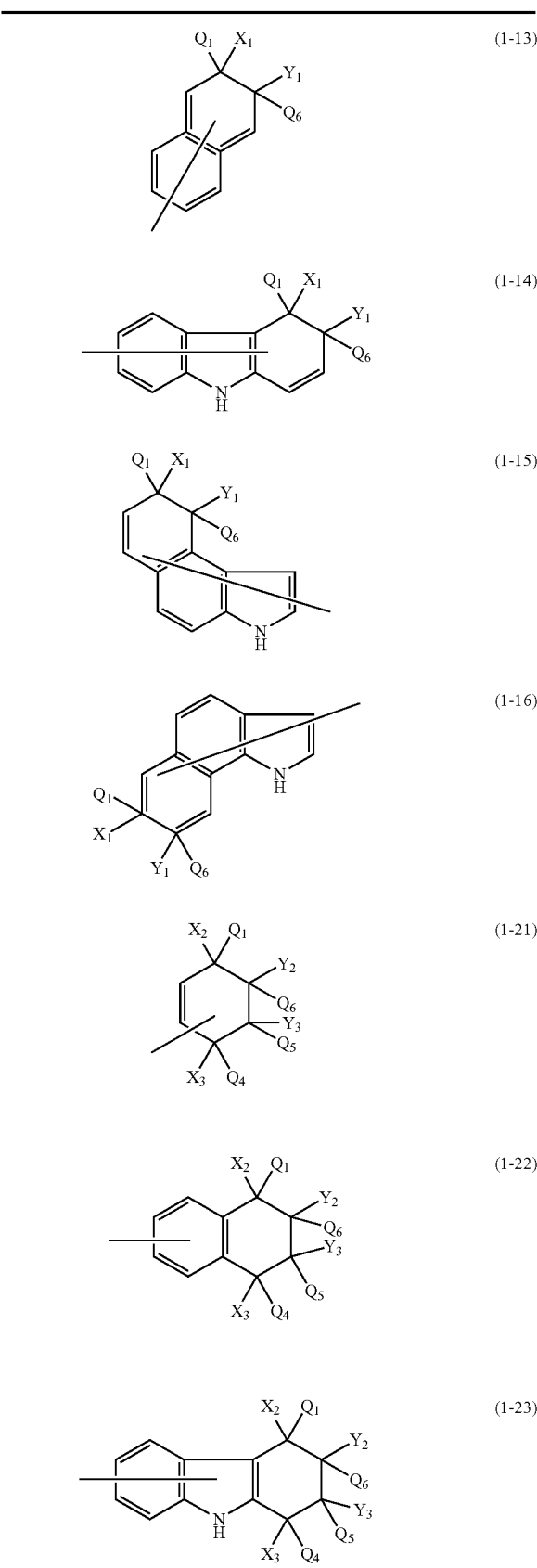

(1-13)
(1-14)
(1-15)
(1-16)
(1-21)
(1-22)
(1-23)
(1-24)
(1-25)

The polyaryl backbone is not particularly limited and may be appropriately selected depending on the intended purpose, but preferred are those having a polyphenylene structure, a polythiophenyl structure and/or a polypyrrolynyl structure and more preferred are those having a polyphenylene structure.

In the case where the polymer has the polyphenylene structure as the polyaryl backbone, the polymer preferably has a polyphenylene structure represented by the following General Formula (III).

General Formula (III)

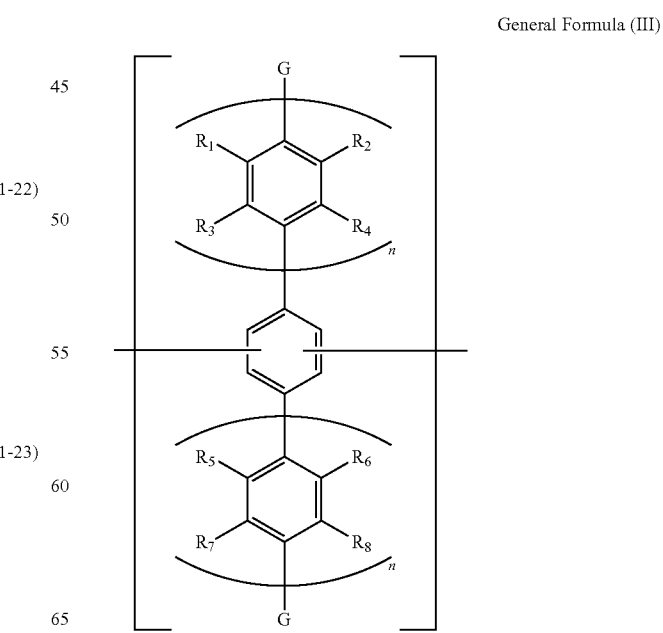

In General Formula (III), n denotes a repeated number and is an integer of 0 to 5; $R_1$ to $R_8$ are each independently selected from a hydrogen group, a halogen atom, an alkyl group and an aryl group, provided that when n≥2, $R_1$ to $R_8$ may be the same or different; and G represents a group including a partial structure represented by General Formula (I) or (II).

One example of the polymer of the present invention includes a polymer having any of the following units, which is a detailed example in the case where the polymer has the polyphenylene structure as the polyaryl backbone. Notably, in the following structural formulas, one of X and Y represents the alkoxy group which may have a substituent, or the acyloxy group which may have a substituent, and the other represents a hydrogen atom.

TABLE 4

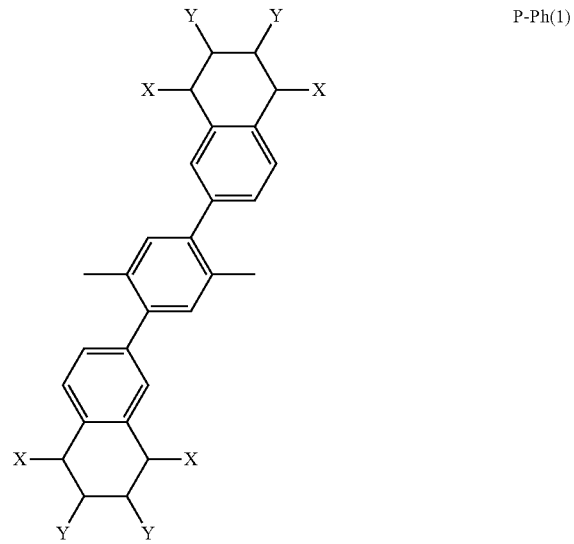

P-Ph(1)

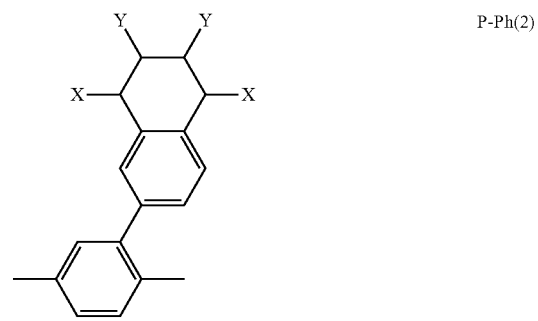

P-Ph(2)

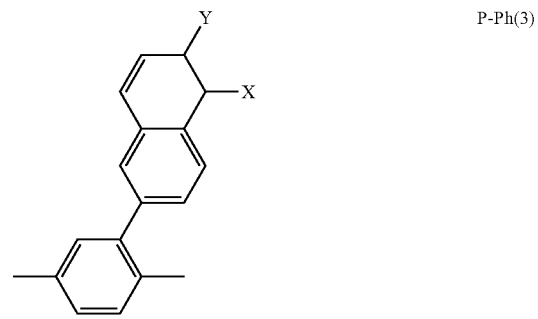

P-Ph(3)

TABLE 4-continued
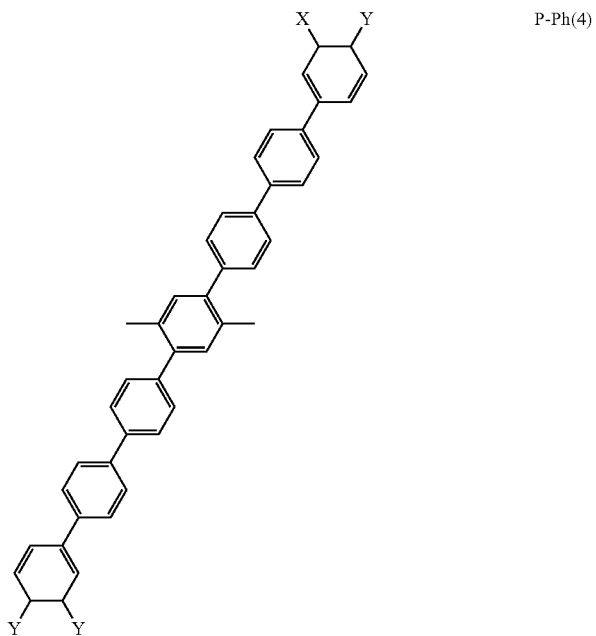
P-Ph(4)
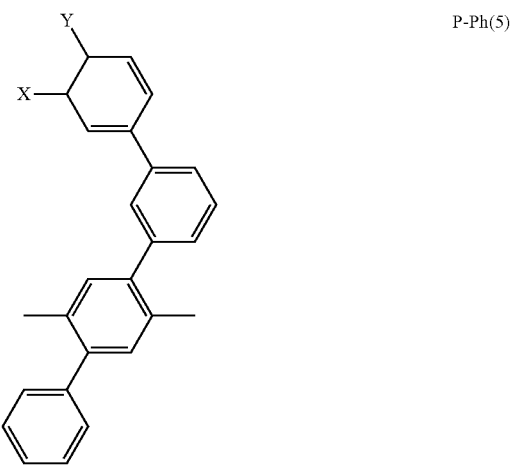
P-Ph(5)
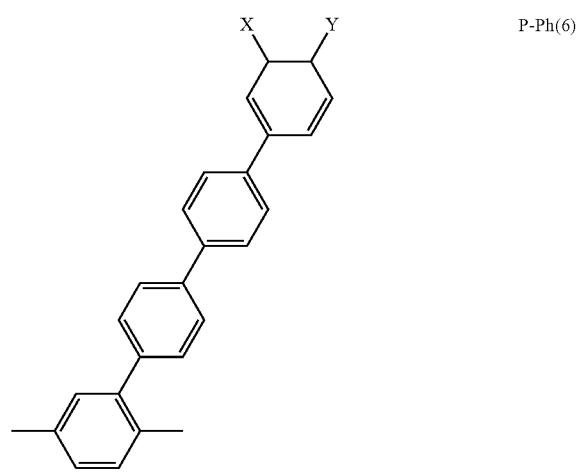
P-Ph(6)

TABLE 4-continued
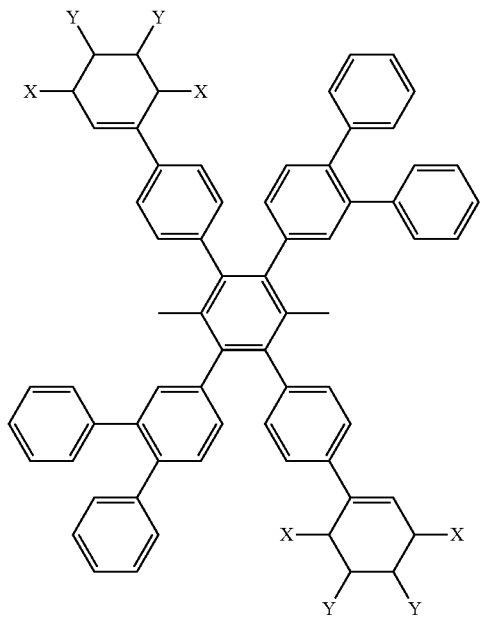
P-Ph(7)
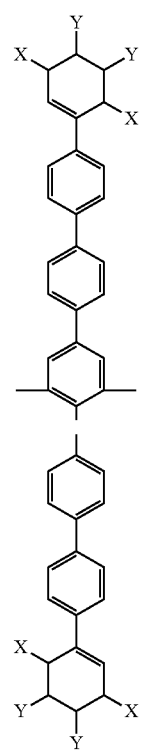
P-Ph(8)

TABLE 4-continued
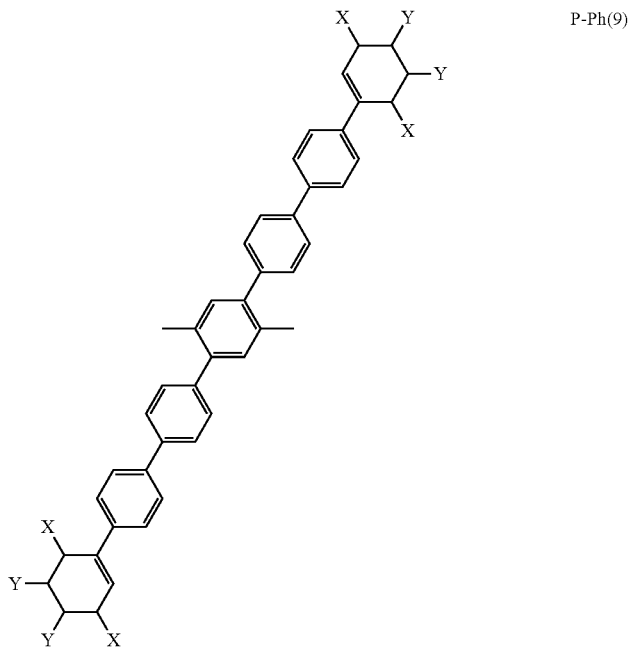
P-Ph(9)
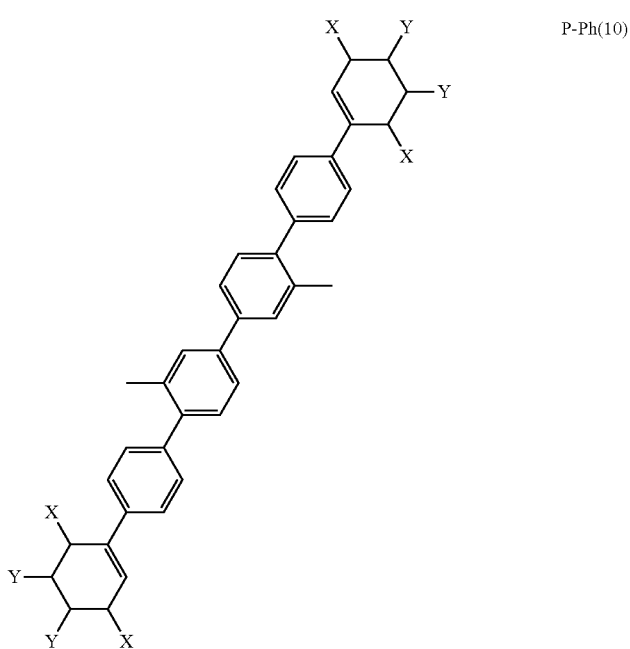
P-Ph(10)

TABLE 4-continued
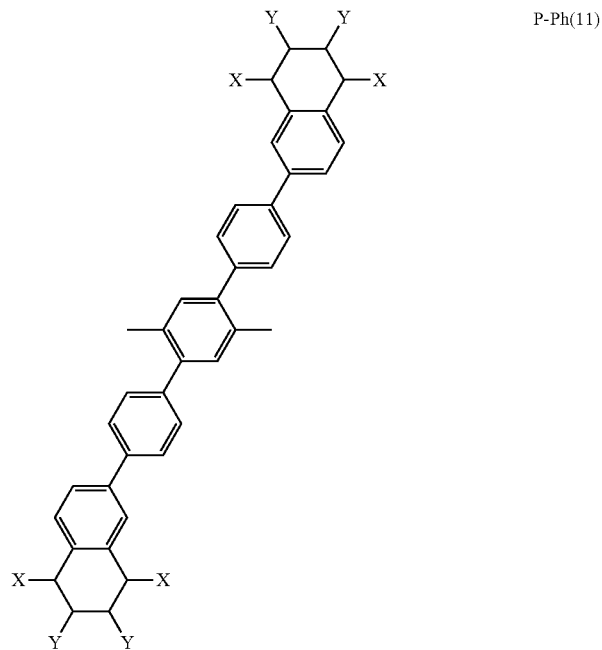
P-Ph(11)
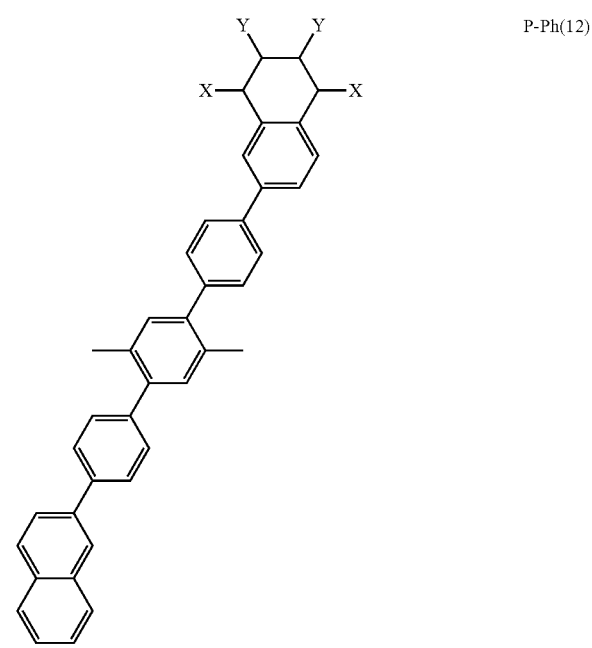
P-Ph(12)

More specific examples of the polymer include a polymer having any of the following units.
TABLE 5
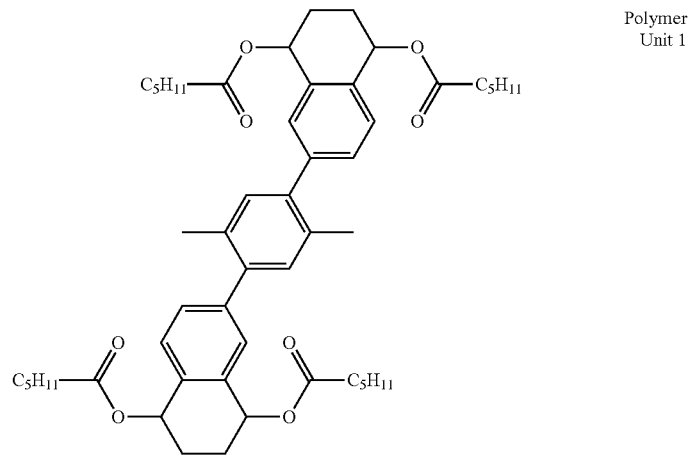
Polymer Unit 1
Polymer Unit 2
Polymer Unit 3

TABLE 5-continued
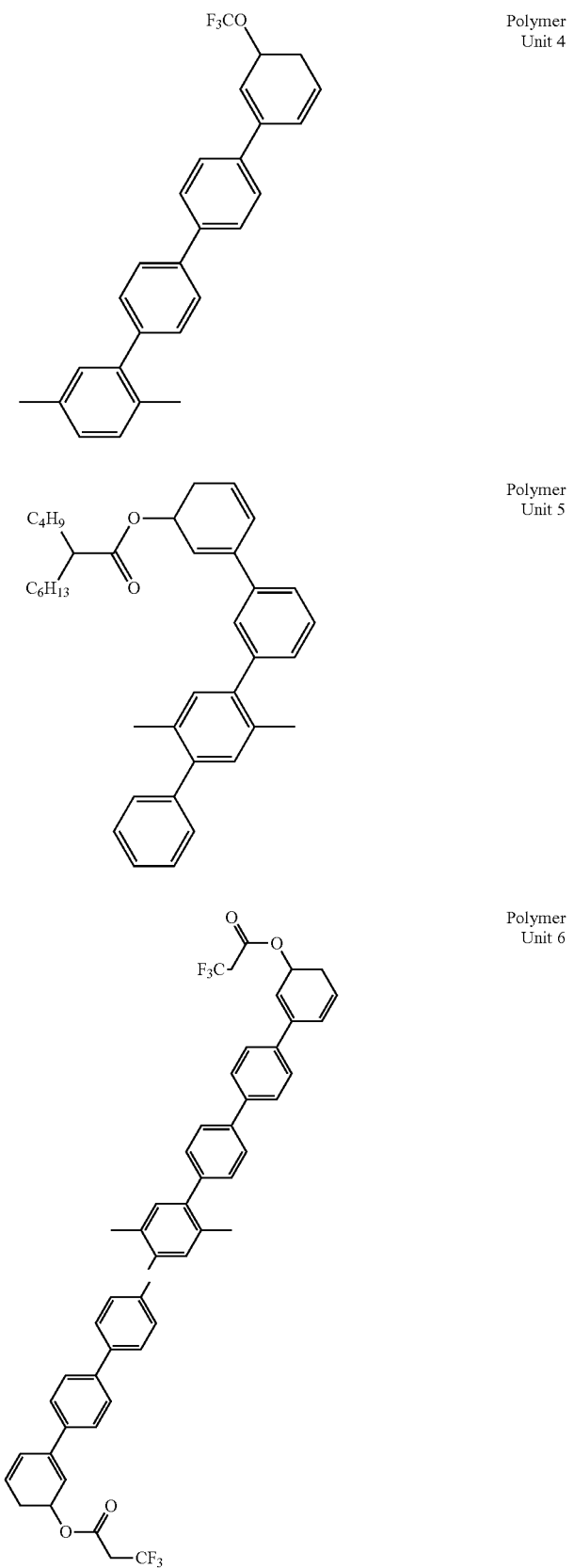
Polymer Unit 4
Polymer Unit 5
Polymer Unit 6

TABLE 5-continued
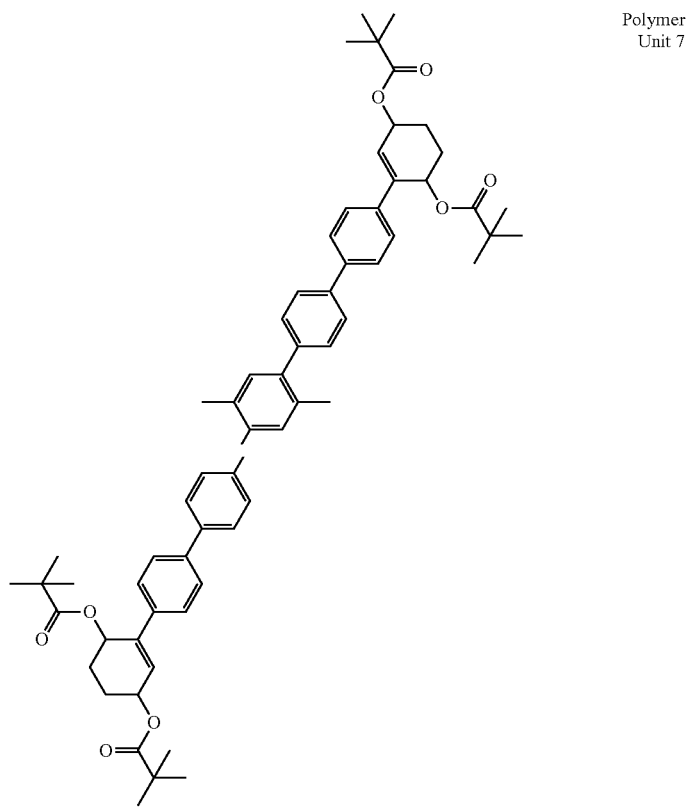
Polymer Unit 7
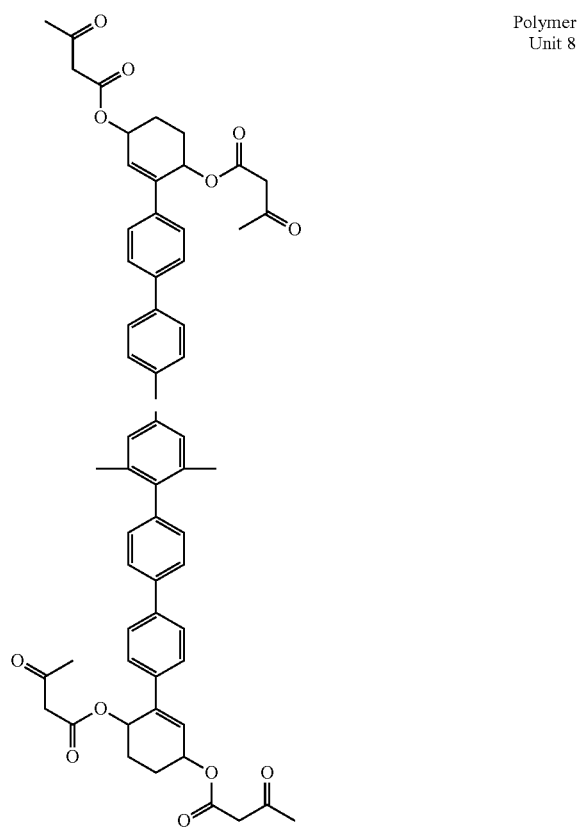
Polymer Unit 8

TABLE 5-continued
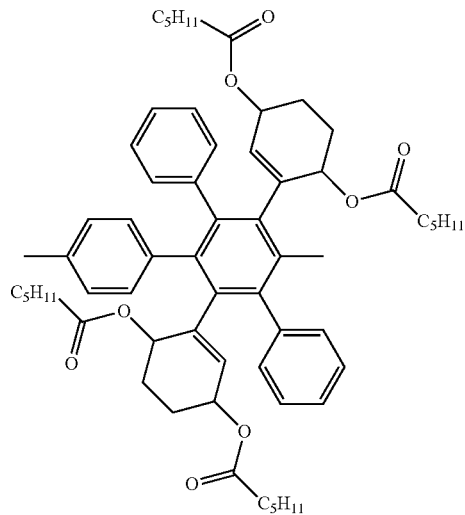
Polymer Unit 9
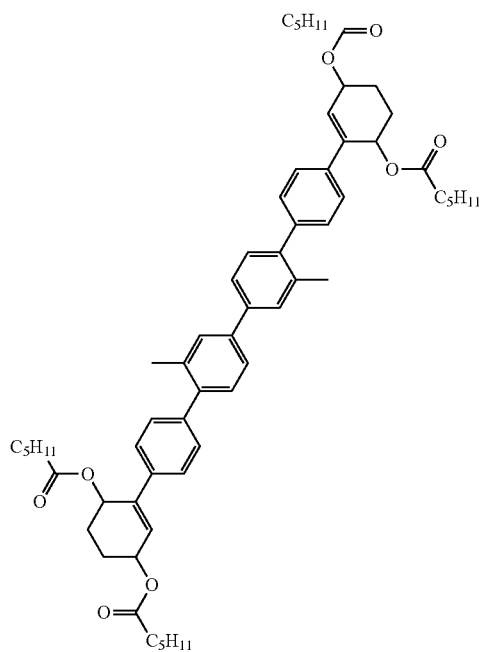
Polymer Unit 10

TABLE 5-continued
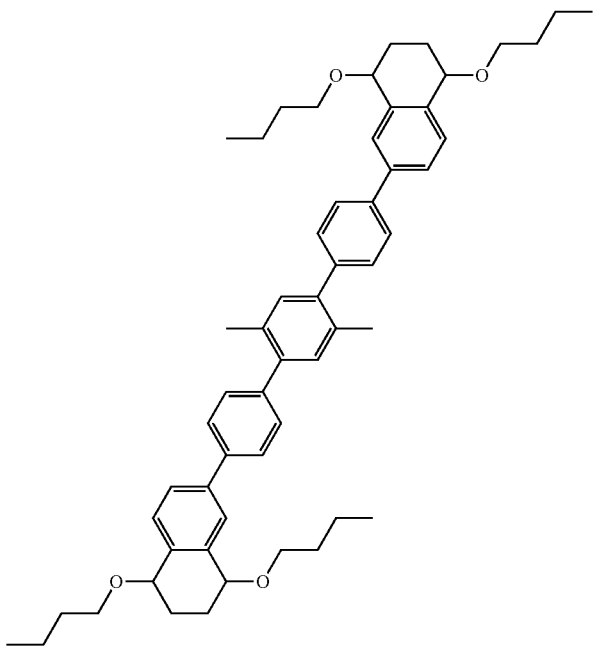 [SMILES: CCCCOC1CCC(OCCCC)c2cc(-c3ccc(-c4cc(C)c(-c5ccc(-c6ccc7c(c6)C(OCCCC)CCC7OCCCC)cc5)cc4C)cc3)ccc21]
Polymer Unit 11
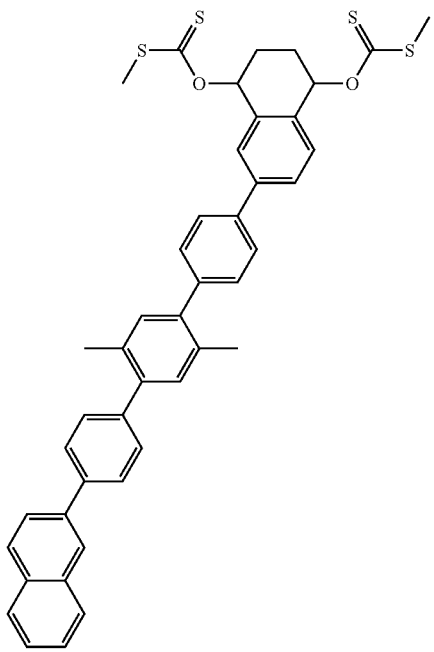 [SMILES: CSC(=S)OC1CCC(OC(=S)SC)c2cc(-c3ccc(-c4cc(C)c(-c5ccc(-c6ccc7ccccc7c6)cc5)cc4C)cc3)ccc21]
Polymer Unit 12

TABLE 5-continued

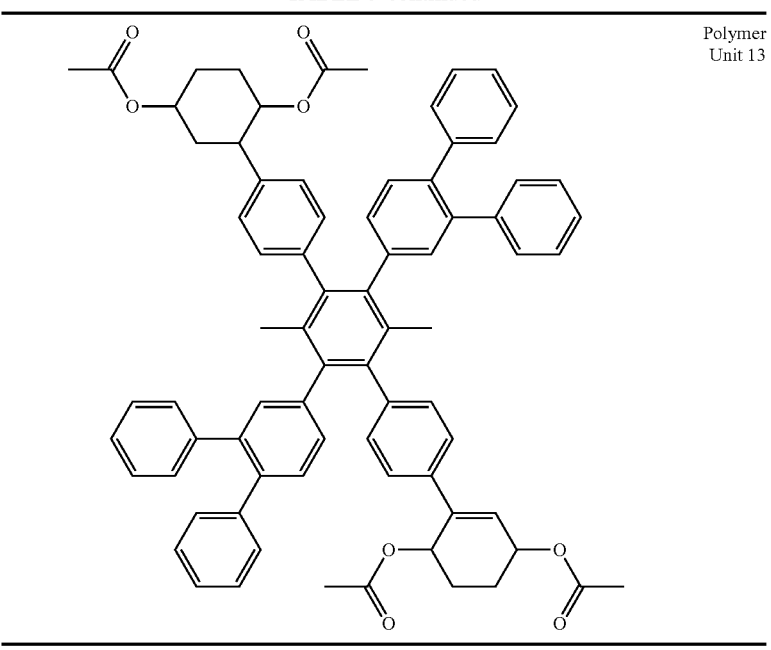

Polymer Unit 13

Here, the side-chain in the above polymer refers to a moiety branched from the longest carbon chain (backbone) in a molecular structure of a chain compound. In the present invention, the partial structure represented by General Formula (I) or (II) may be introduced to any position. For example, preferred results can be obtained in terms of solubility in any case where the partial structure is introduced to the backbone, side-chain or end group. However, more preferred results can be obtained in terms of both solubility and productivity by introducing the partial structure to the side-chain.

—Synthesis Method of Polymer—

As more particular method for synthesizing the polymer, a method in which the polymer is derived from monomers is disclosed. However, a method for synthesizing the polymer according to the present invention is not limited thereto.

One exemplary method for producing the polymer will be described below.

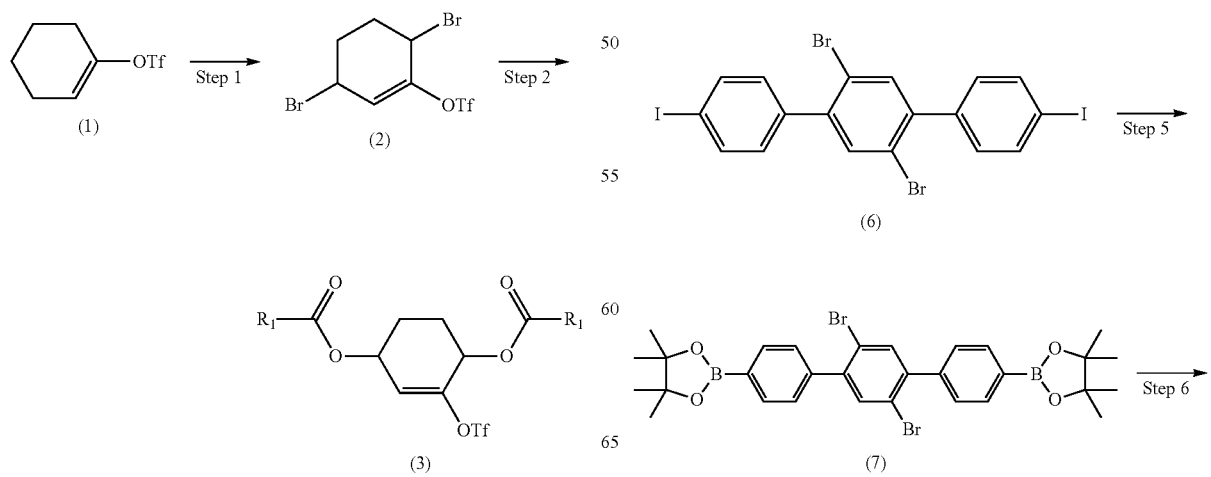

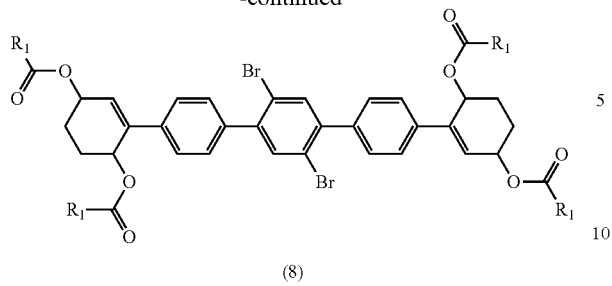

(8)

Step 7

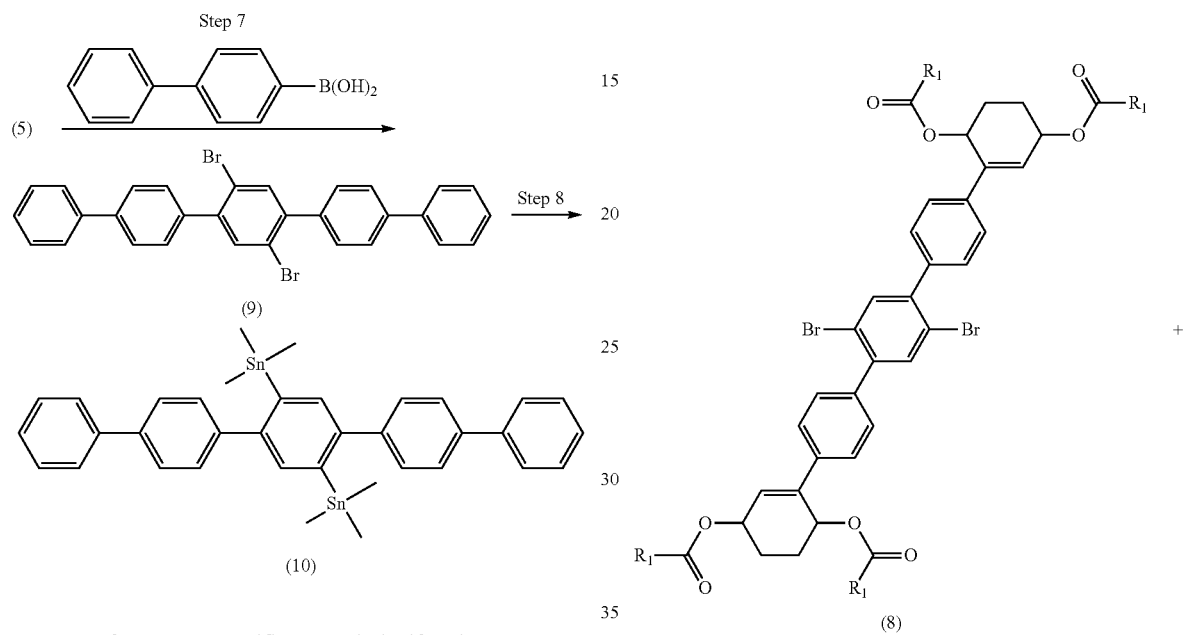

Here, Tf represents a trifluoromethylsulfonyl group.

<Production Example of Monomer>

[Step 1] Compound (2) can be produced from Compound (1) by means of bromination with azobisisobutyronitrile (AIBN) and N-bromosuccinimide (NBS) or with $Br_2$.

[Step 2] General esterification methods or etherification methods can be used. For example, tetramethylammonium hydroxide pentahydrate and R—COOH, or DBU, a base and R—COOH can be used. Alternatively, an alkoxy group can be easily formed using Williamson ether synthesis. Thus, a compound having an acyloxy group used in the present invention (e.g., Compound (3)) can be formed.

[Step 3] Compound (5) can be obtained by Suzuki coupling reaction of dibromodiiodobenzene (4) and a diboron compound. Preferred example of the diboron compound includes diboron esters such as bis(catecholato)diboron, bis(hexyleneglycolato)diboron, bis(pinacolato)diboron and bis(neopentyl)diboron.

[Step 4] Compound (6) can be produced from Compound (5) by Suzuki coupling reaction with diiodobenzene.

[Step 5] Compound (7) can be produced from Compound (6) in the same manner as in Step 3.

[Step 6] Compound (8) can be produced by Suzuki coupling reaction of Compound (3) having an acyloxy group and Compound (7) which is a diboron compound.

[Step 7] Compound (9) can be produced by Suzuki coupling reaction of Compound (5) which is a diborondibromo compound and a biphenylboronic acid compound.

[Step 8] Trimethyl tin compound (10) can be obtained by lithiating Compound (9) with organic lithium (e.g., n-BuLi) under a dehydrated and extremely low temperature condition, followed by reacting with trimethyl tin chloride.

Thus, one exemplary monomer used in the prevent invention can be produced.

[Production Method Example of Polymer]

Production Method Example 1

Copolymer (8-1) can be synthesized by Suzuki coupling reaction of the above-described Compounds (8) and diboronic acids.

Production Method Example 2

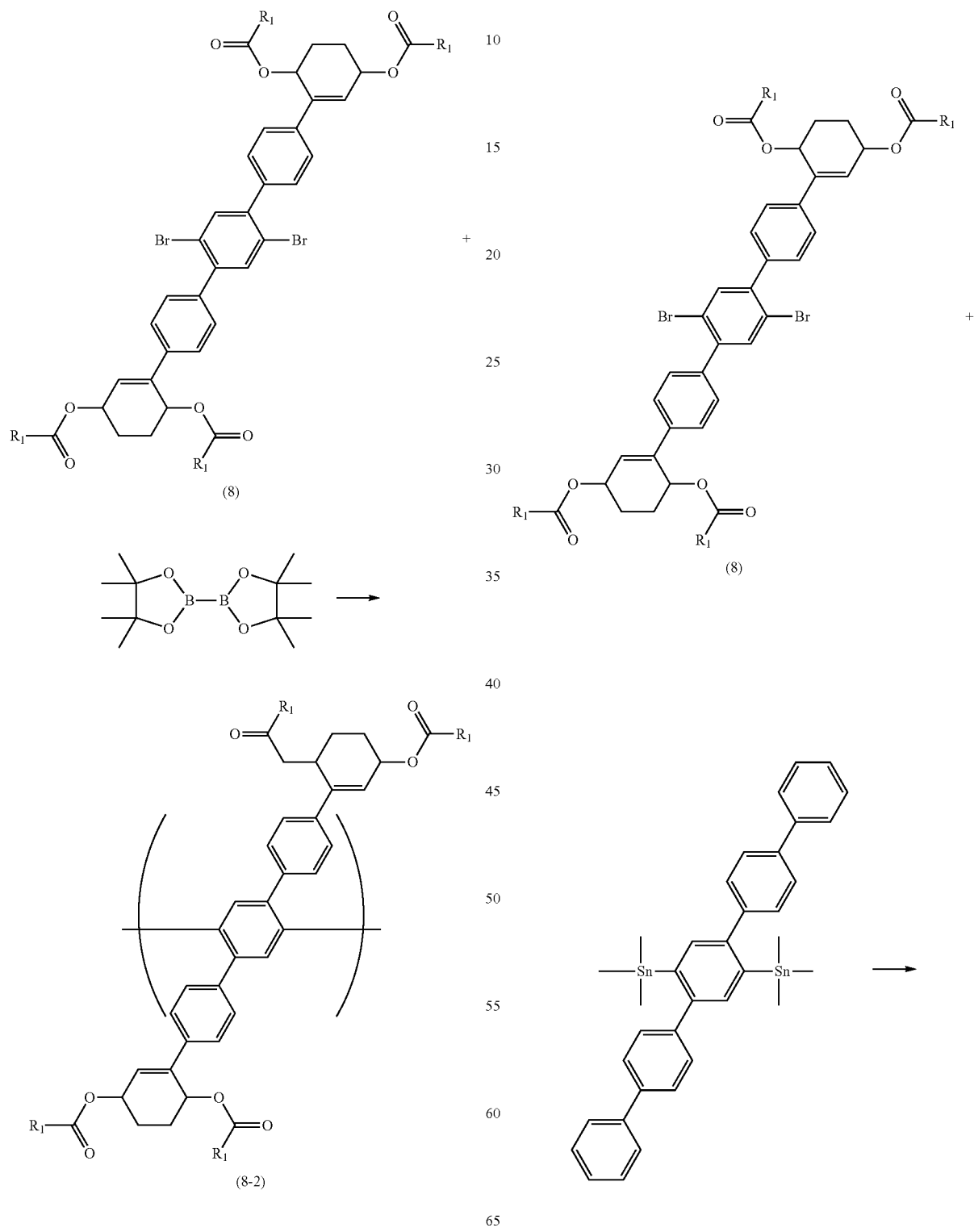

Polymer (8-2) can be obtained by a homo-coupling reaction of the above-described Compounds (8) and diboronic acids via Suzuki coupling reaction. Polymer (8-2) can also be obtained from Compound (8) using Yamamoto reaction.

Production Method Example 3

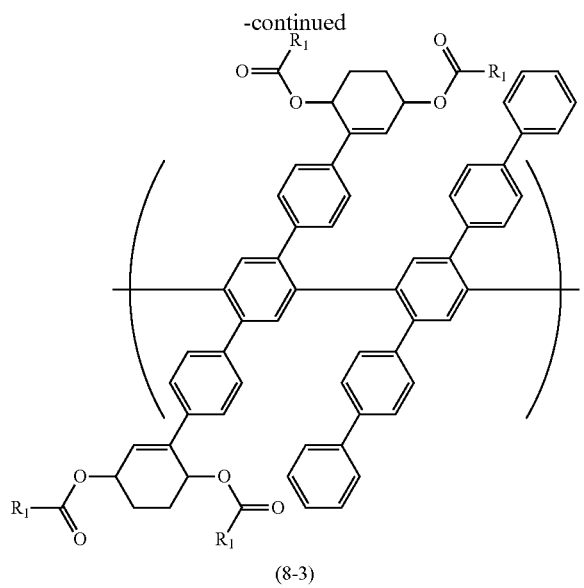

(8-3)

Polymer (8-3) can be obtained by Stille coupling reaction of the above-described Compounds (8) and Compounds (10).

There will be further described polymerization methods in detail.

Examples of a method for producing the polymer of the present invention include an electrical field polymerization method, an oxidative polymerization method and a chemical polymerization method. Preferred is the chemical polymerization method from the viewpoint of selective linkage of linkage positions, and thus being capable of easily obtaining a polymer which is soluble in a solvent while having a high molecular weight.

A monomer is needed to produce the polymer of the present invention. The monomer can be produced using common organic synthesis methods.

In the method for producing the polymer of the present invention, a condensation polymerization can be performed using known condensation reactions depending on substituents which participate in the condensation polymerization. For example, known methods are exemplified such as a method in which monomers are polymerized by Suzuki coupling reaction, a method in which monomers are polymerized by Grignard reaction, a method in which monomers are polymerized by Stille coupling reaction, a method in which monomers are polymerized in the presence of zero-valent nickel complexes (Ni(0) complexes), a method in which monomers are polymerized using an oxidizing agent (e.g., $FeCl_3$), and a method in which monomers are electrochemically oxidative polymerized.

Among them, preferred are the method in which monomers are polymerized by Suzuki coupling reaction, the method in which monomers are polymerized by Grignard reaction, the method in which monomers are polymerized by Stille coupling reaction, and the method in which monomers are polymerized in the presence of zero-valent nickel complexes from the viewpoint of easiness in structure control.

Preferred substituents which participate in the polymerization depend on types of the polymerization reaction. For example, in the case of using the zero-valent nickel complexes (e.g., Yamamoto reaction), preferred examples include a halogen atom, an alkylsulfonate group, an arylsulfonate group and an arylalkylsulfonate group. In the case of using nickel catalysts or palladium catalysts (e.g., Suzuki coupling reaction), preferred examples include an alkylsulfonate group, a halogen atom, a boric acid ester group and —B(OH)$_2$.

Preferred aryl halides are aryl iodides and aryl bromides from the viewpoint of reactivity.

In the case of Grignard reaction, the polymer of the present invention, for example, may be produced as follows. A solution of a Grignard reagent is prepared by reacting halides with metallic Mg in an ether-based solvent (e.g., tetrahydrofuran, diethyl ether and dimethoxyethane). The resultant solution is mixed with a monomer solution which has been separately prepared. After nickel catalysts or palladium catalysts are added to the mixed solution so as not to cause excessive reactions, the resultant solution is increased in temperature, and thus the monomers contained therein are allowed to react with each other under reflux. The Grignard reagent is used in the amount of 1 equivalent or more, preferably 1 equivalent to 1.5 equivalents, more preferably 1 equivalent to 1.2 equivalents relative to that of the monomers. Similarly, in the case of using other polymerization methods, known methods can be used to polymerize monomers.

Examples of aryl boron compounds used in Suzuki coupling reaction include arylboronic acids, arylboronic acid esters or arylboronic acid salts. Among them, preferred are arylboronic acid esters because, unlike arylboronic acids, they do not produce a trianhydride (boroxine). Additionally, arylboronic acid esters have high crystallinity and can be easily purified, which are also preferred.

Examples of a method for synthesizing arylboronic acid esters include a method using the following reactions: (i) a thermal reaction of arylboronic acids with alkyldiols in an anhydrous organic solvent, (ii) a reaction of alkoxyboronic esters with aryl halides in which a halogen moiety has been metalized, (iii) a reaction of alkoxyboronic esters with a Grignard reagent containing aryl halides, or (iv) a thermal reaction of aryl halides with bis(pinacolato)diboron or bis(neopentylglycolato)diboron in the presence of palladium catalysts.

Various palladium catalysts can be used such as $Pd(PPh_3)_4$, $PdCl_2(PPh_3)_2$, $Pd(OAc)_2$, $PdCl_2$, or a compound in which triphenylphosphine is coordinately bonded to palladium carbon. Most generally, $Pd(PPh_3)_4$ is used.

In Suzuki coupling reaction, a base must be used. Relatively weak bases (e.g., $Na_2CO_3$, $NaHCO_3$ and $K_2CO_3$) result in satisfactory results. When Suzuki coupling reaction is affected by steric hindrance, strong bases (e.g., $Ba(OH)_2$ and $K_3PO_4$) are effective. Alternatively, the following can be used such as sodium hydroxide, potassium hydroxide, metal alkoxide (e.g., potassium t-butoxide, sodium t-butoxide, lithium t-butoxide, potassium 2-methyl-2-butoxide, sodium 2-methyl-2-butoxide, sodium methoxide, potassium ethoxide and potassium methoxide).

Phase-transfer catalysts may be used in order to allow reactions to proceed more smoothly. Preferred examples of the phase-transfer catalyst include tetraalkylammonium halides, tetraalkylammonium hydrogen sulfate or tetraalkylammonium hydroxide. Preferred specific examples thereof include tetra-n-butylammonium halides, benzyltriethylammonium halides or tricaprylylmethylammonium chloride.

Examples of reaction solvents include alcohol- or ether-based solvents (e.g., methanol, ethanol, isopropanol, butanol, 2-methoxyethanol, 1,2-dimethoxyethane or bis(2-methoxyethyl)ether); cyclic ether-based solvents (e.g., dioxane or tetrahydrofuran); benzene, toluene, xylene, dimethylsulfoxide, N,N-dimethylformamide, N,N-methylpyrrolidone and 1,3-dimethyl-2-imidazolidinone.

Examples of zero-valent nickel catalysts used in Yamamoto reaction include bis(1,5-cyclooctadiene)nickel(0), (ethylene)bis(triphenylphosphine)nickel(0) and tetrakis(triphenylphosphine)nickel. Among them, preferred is bis(1,5-cyclooctadiene)nickel(0).

The reaction temperature in the polymerization reaction is appropriately set depending on reactivity of used monomers or a reaction solvent, but is preferably equal to or lower than a boiling point of the reaction solvent.

The reaction time in the polymerization reaction is appropriately set depending on reactivity of used monomers or a molecular weight of a desired polymer, but is preferably 2 hours to 50 hours, more preferably 5 hours to 24 hours.

A molecular weight modifier which modifies a molecular weight in the above polymerization procedure or an end-capping agent which serves as an end-modifying group to produce end-capped polymer may be added to a reaction system. The molecular weight modifier or the end-capping agent may be added at the start of a reaction. Therefore, a group derived from the capping agent may be bound at the end of the polymer of the present invention.

Examples of the molecular weight modifier or the end-capping agent include a compound having one reaction-active group such as phenylboronic acid, bromobenzene or benzene iodide.

The polymer of the present invention has preferably a number average molecular weight based on polystyrene of 1,000 to 1,000,000, more preferably of 2,000 to 500,000. When the molecular weight is too small, the polymer is deteriorated in film-forming property (e.g., occurrence of crack), which is less practical use. Meanwhile, when the molecular weight is too large, the polymer is deteriorated in solubility in common organic solvents, leading to increasing viscosity of a solution thereof. Accordingly, the solution is difficult to be coated, which is problematic in practical use.

A small amount of a branching agent may be added during polymerization in order to improve mechanical property. The branching agent used is a compound having three or more polymerization reaction-active groups, which may be the same or different. The branching agent may be used alone or in combination.

Impurities such as bases used in the polymerization, unreacted monomers, the end-capping agent, and inorganic salts produced during polymerization are removed from thus obtained polymer of the present invention prior to use. The impurities may be removed using any conventional known purification methods such as a reprecipitation, an extraction, Soxhlet extraction, an ultrafiltration or a dialysis.

(Ink)

An ink of the present invention includes at least the polymer of the present invention; preferably includes a solvent and a viscosity adjusting liquid; and, if necessary, further includes other ingredients such as a dispersing agent, a filler, nano-particles, an oxidizing agent and a reducing agent.

The solvent is an aromatic solvent, a halogenated solvent, an ether solvent or any combination thereof.

Examples of the aromatic solvent include aromatic solvents which may contain an alkoxy group or halogen, such as benzene, toluene, xylene, ethylbenzene, diethylbenzene, anisole, chlorobenzene, dichlorobenzene and chlorotoluene.

Examples of the halogenated solvent include halogenated hydrocarbon solvents such as dichloromethane, dichloroethane, chloroform, carbon tetrachloride, tetrachloroethane and trichloroethane.

Examples of the ether solvent include dibutyl ether, tetrahydrofuran and dioxane.

Preferably, a viscosity adjusting liquid is further added to the solvent.

The viscosity adjusting liquid is an alcohol solution, a ketone solution, a paraffin solvent, a solution of an alkyl-substituted aromatic compound having 4 or more carbon atoms, or any combination thereof.

Examples of the alcohol solution include linear or branched alcohol solvents such as methanol, ethanol, propanol, butanol, pentanol, hexanol, octanol, nonanol, cyclohexanol, methyl cellosolve, ethyl cellosolve, ethylene glycol and benzyl alcohol.

Examples of the alkyl-substituted aromatic compound having 4 or more carbon atoms include alkyl-substituted aromatic compounds having 4 or more carbon atoms which may have a linear or branched alkyl group, such as butylbenzene, cyclohexylbenzene, tetralin and dodecylbenzene.

Note that, the alkyl-substituted aromatic compound having 4 or more carbon atoms refers to an aromatic compound having as a substituent an alkyl group having 4 or more carbon atoms. The upper limit of the number of carbon atoms of the alkyl group is not particularly limited but is, for example, about 50.

Here, when an alcohol solution is used as the viscosity adjusting liquid, care should be taken about storage management of the alcohol solution since alcohol easily absorbs water. However, when the solution of an alkyl-substituted aromatic compound having 4 or more carbon atoms is used as the viscosity adjusting liquid, it can be stored in a simple manner by virtue of its hydrophobicity, which is advantageous.

The solution of an alkyl-substituted aromatic compound having 4 or more carbon atoms has an advantage that it can be adjusted in viscosity by changing its alkyl group; e.g., extending its alkyl group.

The alcohol solution is suitably used for preparing a solution suitable for film-forming processes requiring a solution having high viscosity (e.g., the inkjet method) since the alcohol solution has high viscosity.

The type or amount of the viscosity adjusting liquid may be appropriately selected depending on the viscosities required for various film-forming processes. When the solvent is selected from an aromatic solvent, a halogenated solvent and an ether solvent, the polymer of the present invention serving as an organic EL material can be dissolved in the solvent in an amount equal to or more than a required amount (e.g., 1% by mass).

Also, addition of the viscosity adjusting solution selected from an alcohol solution, a ketone solution, a paraffin solvent and a solution of an alkyl-substituted aromatic compound having 4 or more carbon atoms can increase the viscosity of a solution containing an organic EL material to have a viscosity suitable for various coating units (inkjet, nozzle print and spin coating).

Needless to say, the solvent is an aromatic solvent, a halogenated solvent, an ether solvent or any combination thereof, and two or more thereof may be mixed together.

Similarly, needless to say, the viscosity adjusting solution is an alcohol solution, a ketone solution, a paraffin solvent, a solution of an alkyl-substituted aromatic compound having 4 or more carbon atoms, or any combination thereof, and two or more thereof may be mixed together.

(Organic Film)

An organic film of the present invention includes at least the polymer of the present invention or the ink of the present invention; and, if necessary, further includes other ingredients such as a solvent, a dispersing agent, a filler, nano-particles, an oxidizing agent and a reducing agent.

A method for forming the organic film is not particularly limited and may be appropriately selected depending on the intended purpose. Examples thereof include a method in which the ink or a solution containing at least the polymer is applied to an object (e.g., substrate) and dried or a method in which the polymer is deposited on the object.

Examples of the substrate (i.e., support) include plastic, metal, silicon wafer or glass.

The method for applying the solution is not particularly limited and may be appropriately selected depending on the intended purpose. Examples thereof include a spin-coat method, a cast method, a dip method, an ink-jet method, a doctor-blade method, a screen-printing method, a vacuum vapor deposition or a sputtering.

(Electronic Device)

An electronic device of the present invention includes at least the organic film of the present invention; and, if necessary, further includes other layers and other members.

The electronic device is preferably an electroluminescence element, an organic transistor including, as an active layer, the organic film, or an electrode.

EXAMPLES

Hereinafter, the present invention will be further described with the following Examples, which should not be construed as limiting the scope of the present invention thereto.

At first, representative examples of a method for synthesizing a π electron conjugated compound precursor exemplified in the following Examples is described below. In the following Synthesis Examples (Examples) and Application Examples, compounds were identified using the following devices: a NMR spectrometer [JNM-ECX (product name), 500 MHz, product of JEOL Ltd.], a mass spectrometer [GC-MS, GCMS-QP2010 Plus (product name), product of SHIMADZU CORPORATION], an infrared spectrometer [Spectrum GX (product name), product of PerkinElmer Co., Ltd.], a UV-Vis spectrometer [V-600 (product name), product of JASCO Corporation], a precise mass spectrometer [LC-TofMS, Alliance-LCT Premire (product name), product of Waters Co.)], an elemental analyzer [(CHN) (CHN recoder MT-2, product of Yanagimoto Mfg. Co., Ltd.), and an elemental analyzer (sulfur) (ion chromatography; anion analysis system: DX320 (product name), product of Dionex Corporation)].

Example 1

Synthesis Example 1

Using the following method, [Polymer 1] of the present invention was synthesized.

(Synthesis of Compound 2)

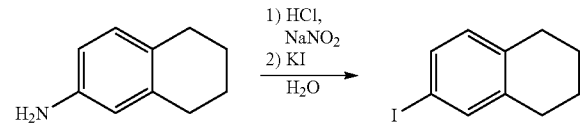

A 500 mL beaker was charged with 1,2,3,4-tetrahydro-6-iodo naphthalene (10 g, 65.3 mmol) and 15% by mass HCl (60 mL). While the resultant mixture was being maintained at 5° C. or lower with ice cooling, aqueous sodium nitrite solution (5.41 g, 78.36 mmol in 23 mL of water) was added dropwise thereto. After completion of dropwise addition, the mixture was stirred at the same temperature for 1 hour. Then, aqueous potassium iodide solution (13.0 g, 78.36 mmol in 50 mL of water) was added to the mixture at one time. The beaker was taken out from the ice bath and the mixture was stirred for 3 hours. Thereafter, the mixture was heated at 60° C. for 1 hour until generation of nitrogen was terminated. After cooled to room temperature, the reaction solution was extracted with diethyl ether. The organic layer was washed with 5% by mass aqueous sodium thiosulfate solution (100 mL×3) and further washed with saturated brine (100 mL×2). Moreover, the organic layer was dried over sodium sulfate, followed by filtration. The filtrate was concentrated to obtain a red oil.

The obtained red oil was purified through silica gel chromatography (solvent: hexane) to obtain Compound 2 as a colorless oil (yield amount: 12.0 g, yield rate: 71.2%).

Mass spectrometry (GC-MS): m/z=258 (M$^+$).

(Synthesis of Compound 3)

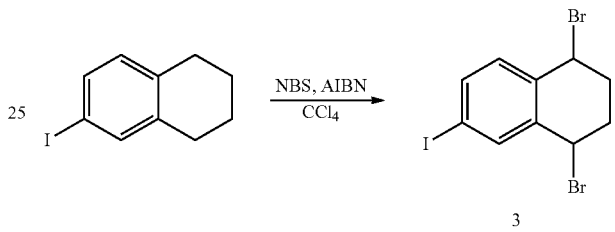

A 100 mL round-bottom flask was charged with Compound 2 (3.1 g, 12 mmol), azobisisobutylonitrile (59 mg, (136 mmol), carbon tetrachloride (50 and N-bromosuccinimide (4.7 g, 26.4 mmol). After the flask had been purged with argon gas, the mixture was gently heated to 80° C., stirred for 1 hour at the same temperature and then cooled to room temperature. The resultant precipitates were removed through filtration. The filtrate was concentrated under reduce pressure to obtain Compound 3 as a pale yellow solid (yield amount: 4.99 g, yield rate: 100%), which was then used in the next reaction without any further purification.

Mass spectrometry (GC-MS): m/z=413 (M$^+$).

(Synthesis of Compound 4)

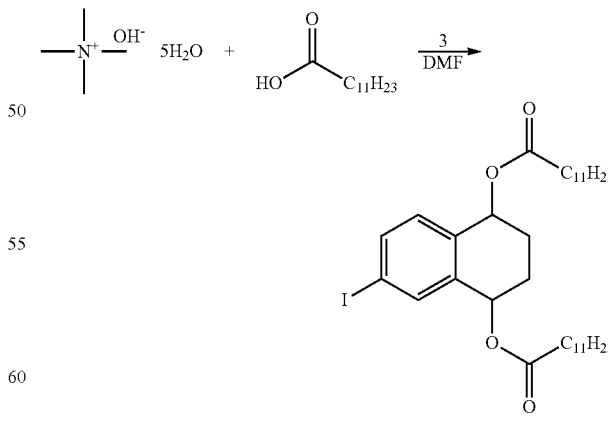

A 100 mL round-bottom flask was charged with tetramethylammonium hydroxide pentahydrate (3.62 g, 20 mmol), lauric acid (2.51 mL, 20 mmol), and N,N-dimethylformamide (DMF) (30 mL). After the flask had been purged with argon gas, the mixture was stirred for 2.5 hours at room temperature. Then, Compound 3 (4.16 g, 10 mmol) was added to the resultant mixture, followed by stirring for 16 hours at room temperature. The resultant reaction solution was diluted with ethyl acetate (100 mL). Pure water (200 mL) was added to the reaction solution to separate an organic layer. An aqueous layer was extracted with ethyl acetate (30 mL×4). The combined organic layer was washed sequentially with saturated aqueous sodium hydrogen carbonate solution and saturated brine, and dried over magnesium sulfate. The filtrate was concentrated to obtain a orange oil. The obtained orange oil was purified through silica gel chromatography (solvent: ethyl acetate/hexane (5/95, v/v)) to obtain Compound 4 as a white solid (yield amount: 40.5 g, yield rate: 62%).

Mass spectrometry (GC-MS): m/z=654 (M+).

(Synthesis of Compound 6)

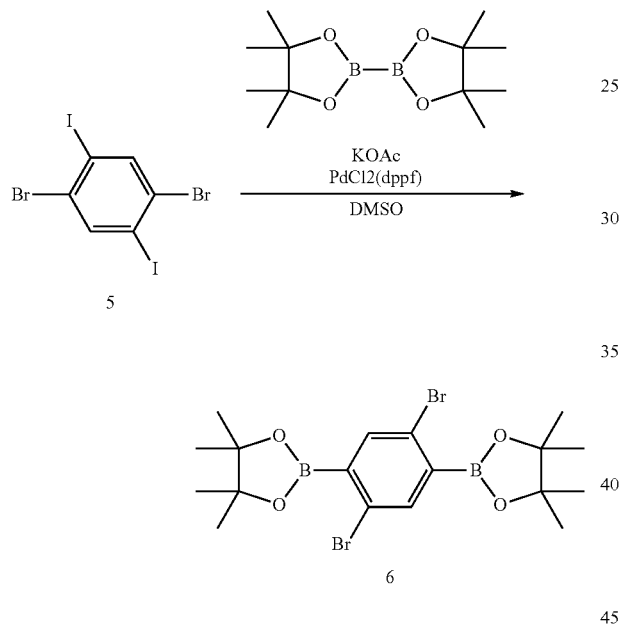

A 300 mL round-bottom flask was charged with dibromodiiodobenzene (5.2 g, 10.6 mmol), dimethyl sulfoxide (DMSO) (100 mL), potassium acetate (6.6 g, 67 mmol), and 1,1'-bis(diphenylphosphino)ferrocene-palladium(II)dichloride-dichloromethane complex [PdCl$_2$(dppf).CH$_2$Cl$_2$] (522 mg, 0.64 mmol), followed by heating and stirring at, 50° C. under an argon atmosphere. After 8 hours, the resultant reaction solution was diluted with ethyl acetate (100 mL). Pure water (200 mL) was added to the reaction solution to separate an organic layer. An aqueous layer was extracted with ethyl acetate (30 mL×4). The combined organic layer was washed sequentially with saturated aqueous sodium hydrogen carbonate solution and saturated brine, and dried over magnesium sulfate. The filtrate was concentrated to obtain a brown solid. The obtained brown solid was recrystallized from ethanol to obtain Compound 6 as a brown solid (yield amount: 520 mg, yield rate: 10%).

Mass spectrometry (GC-MS): m/z=486 (M+).

Elemental analysis: C, 44.32; H, 5.37 (calculated); C, 43.5; H, 5.20 (found).

(Synthesis of Compound 7)

A 100 mL round-bottom flask was charged with dibromodiboronic ester (0.4 g, 0.87 mmol), DMF (20 mL), potassium acetate (1.1 g, 0.87 mmol), and tetrakis(triphenylphosphine)palladium(0) [Pd(PPh$_3$)$_4$] (201 mg, 0.17 mmol), followed by heating and stirring at 80° C. under an argon atmosphere. After 8 hours, the resultant reaction solution was diluted with ethyl acetate (100 mL) Pure water (200 mL) was added to the reaction solution to separate an organic layer. An aqueous layer was extracted with ethyl acetate (30 mL×4). The combined organic layer was washed sequentially with saturated aqueous sodium hydrogen carbonate solution and saturated brine, and dried over magnesium sulfate. The filtrate was concentrated and purified through silica gel chromatography (toluene 100%) to obtain Compound 7 as a yellow liquid (yield amount: 1.1 g, yield rate: 30%).

Mass spectrometry (GC-MS): m/z=1.287 (M+).

(Synthesis of Compound 9)

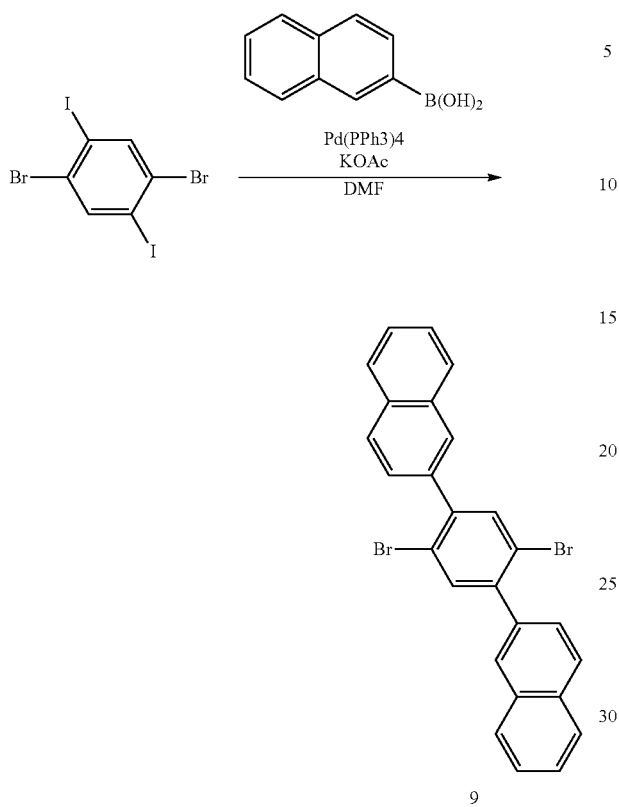

Dibromodiiodobenzene (5.2 g, 11 mmol), 2-naphthalene boronic acid (product of Tokyo Chemical Industry Co., Ltd., 3.9 g, 23 mmol), potassium phosphate (20 g), Pd(PPh$_3$)$_4$ (1.26 g, 1.1 mmol) and DMF (200 mL) were mixed, followed by heating at 80° C. After heating for 8 hours, water was added thereto. The resultant precipitate was filtrated, washed with methanol, and recrystallized from toluene to obtain Compound 9 as a white solid (yield amount: 4.3 g, yield rate: 80%).

Mass spectrometry (GC-MS): m/z=486 (M$^+$).

(Synthesis of Compound 11)

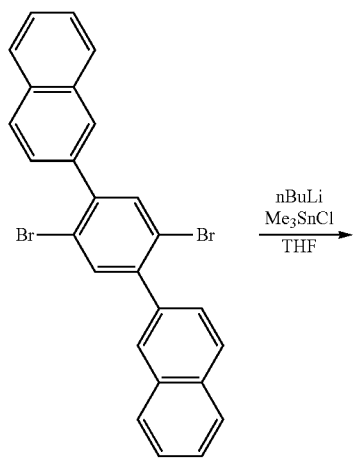

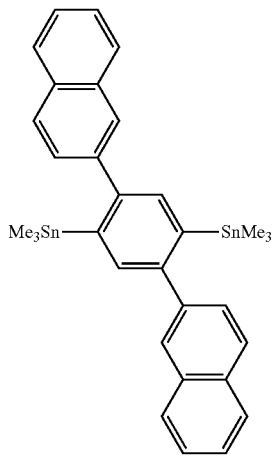

A 300 mL round-bottom flask was charged with dibromodinaphthalenebenzene (4.2 g, 8.6 mmol), followed by cooling to −70° C. in an dry ice-methanol bath under an argon atmosphere. A 1.6 M solution of n-butyllithium in hexane (22 mL, 36 mmol) was added dropwise thereto for 4 hours. Thereafter, a 1.0 M solution of trimethyltin chloride in tetrahydrofuran (THF) (18 mL, 18 mmol) was added thereto, followed by stirring overnight at room temperature. The resultant solution was extracted with ethyl acetate and filtered with an alumina filter. The filtrate was concentrated and recrystallized from ethanol/toluene to obtain a desired product (Compound 11) (yield amount: 1.3 g, yield rate: 23%).

Mass spectrometry (GC-MS): m/z=658 (M$^+$).

(Synthesis of Polymer 1)

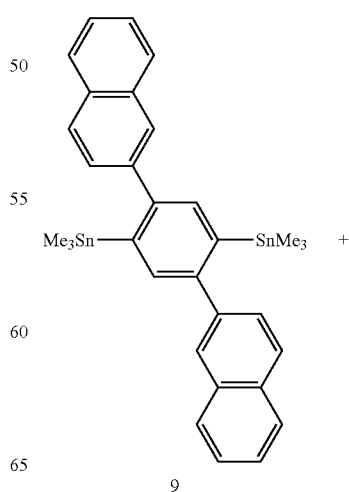

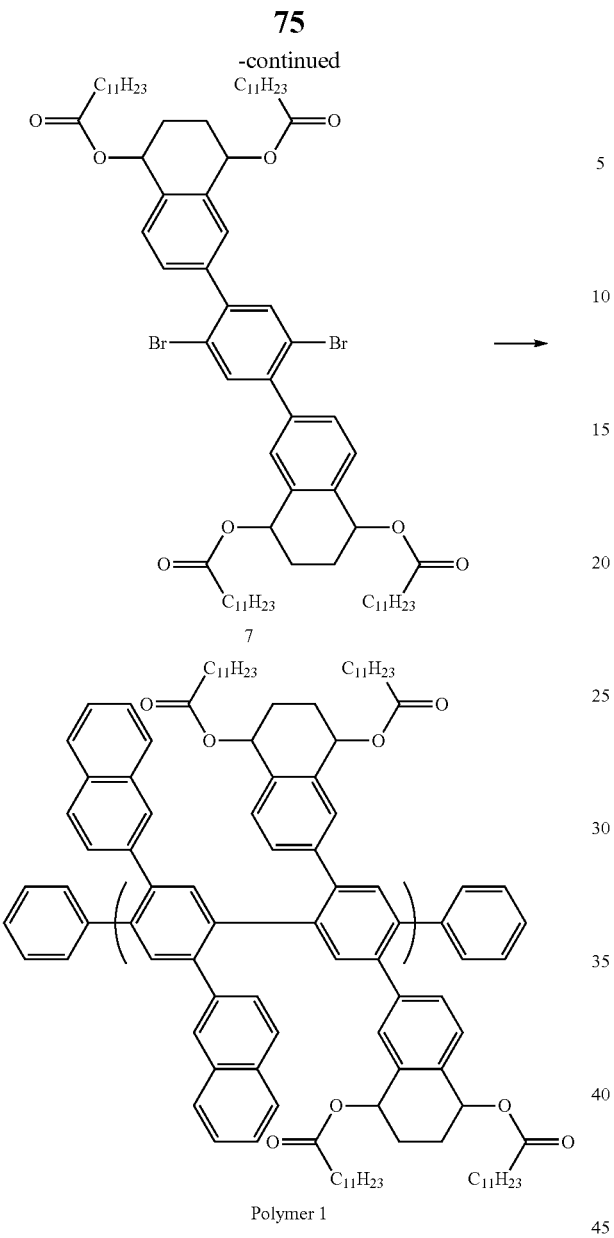

Polymer 1

A 100 mL flask equipped with a mechanical stirrer was charged with acyloxy compound 7 (1.29 g, 1.0 mmol), ditrimethyltin (656 mg, 1.0 mmol) and anhydrous toluene (20 mL), followed by degassing with argon for 30 min. Thereafter, Pd(PPh$_3$)$_4$ (58 mg, 0.05 mmol) was added thereto and heated at 80° C. After heating for 16 hours, bromobenzene (31 mg, 0.2 mol) was added thereto and heated for 1 hour. Further, trimethyl(phenyl)tin (48 mg, 0.2 mmol) was added thereto and heated for 2 hours. The resultant reaction solution was reprecipitated in methanol. The resultant solid was filtered off.

The solid was subjected to Soxhlet extraction with methanol to elute impurities therein. In addition, Soxhlet extraction with toluene was performed to extract the solid. The resultant was concentrated with an evaporator and reprecipitated in methanol to obtain Polymer 1 as a yellow solid (yield amount: 1.0 g).

The Polymer 1 was found to have a number average molecular weight of 11,000 based on polystyrene.

Example 2

Synthesis Example 2

Using the following method, [Polymer 2] of the present invention was synthesized.

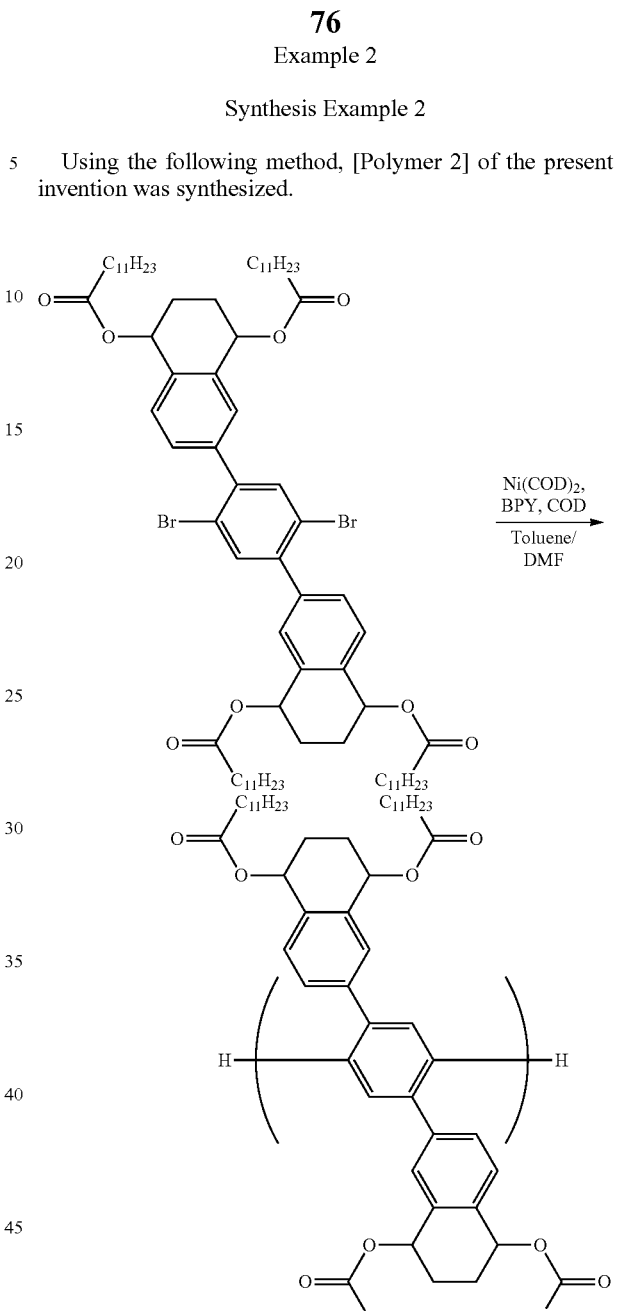

A 100 mL round-bottom flask was charged with Compound 7 (0.5 mM, 665 mg), bis(1,5-cyclooctadiene)nickel(0) (1 mM, 275 mg), 2,2'-bipyridyl (1 mM, 156 mg) and 1,5-cyclooctadiene (1 mM, 123 µL). Anhydrous toluene (10 mL) was added to the flask, which was then purged with argon, followed by stirring under heating for 40 hours. The reaction mixture was added dropwise to a mixture of methanol (100 mL) and 1N aqueous hydrochloric acid (100 mL), and the precipitates that formed were collected through filtration. After the collected precipitates had been dried in vacuum, the resultant solid was washed through Soxhlet extraction with methanol. In addition, Soxhlet extraction with toluene was performed to extract the solid. The resultant was concentrated with an evaporator and reprecipitated in methanol to obtain Polymer 2 as a pale yellow solid (yield amount: 320 mg). FIG. 1 is an infrared spectrum of the Polymer 2. The Polymer 2 was found to have a number average molecular weight of 9,000.

Example 3

Synthesis Example 3

Using the following method, [Polymer 3] of the present invention was synthesized.

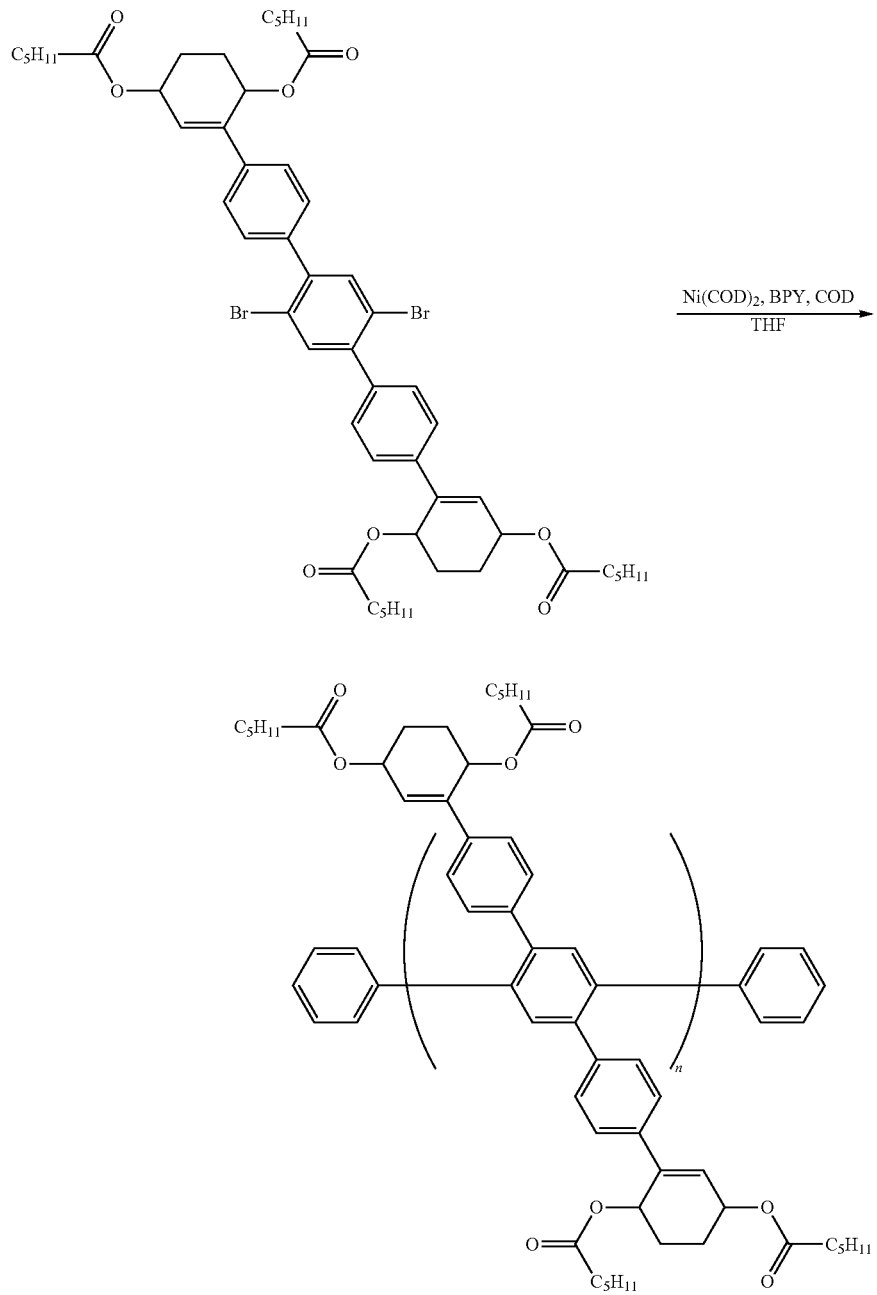

A 100 mL round-bottom flask was charged with a dibromo compound (2.01 g, 2 mM) which was synthesized by the method described in the above <Production Example of Monomer>, bis(1,5-cyclooctadiene)nickel(0) (312 mg, 2 mM), 2,2'-bipyridyl (550 mg, 2 mM) and 1,5-cyclooctadiene (245 μL 2 mM). Anhydrous toluene (10 mL) was added to the flask, which was then purged with argon, followed by stirring under heating for 32 hours. The reaction mixture was added dropwise to a mixture of methanol (100 mL) and 1N aqueous hydrochloric acid (100 mL), and the precipitates that formed were collected through filtration. After the collected precipitates had been dried in vacuum, the resultant solid was washed through Soxhlet extraction with methanol. In addition, Soxhlet extraction with toluene was performed to extract the solid. The resultant was concentrated with an evaporator and reprecipitated in methanol to obtain Polymer 3 as a pale yellow solid (yield amount: 1.25 g). The Polymer 3 was found to have a number average molecular weight of 15,000.

Comparative Example

Comparative Synthesis Example

Using the following method, a phenylene polymer was synthesized as a comparative polymer.

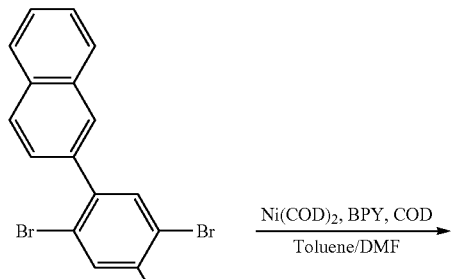

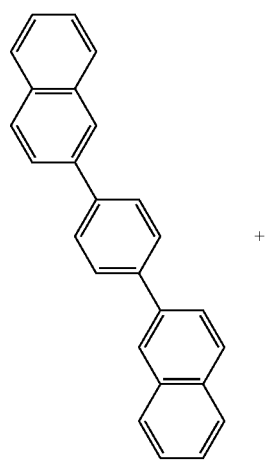

+

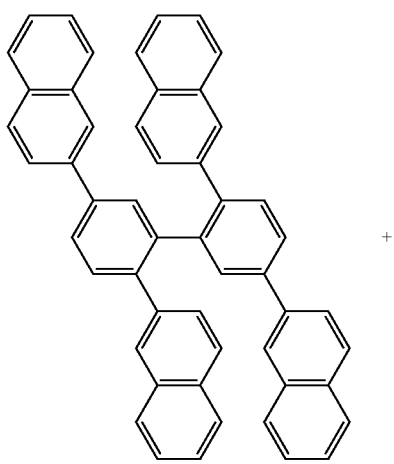

+

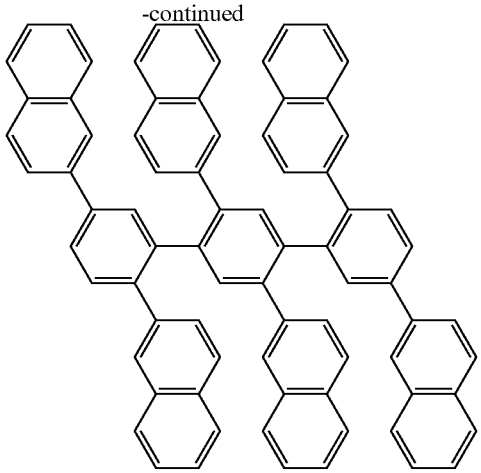

A 100 mL round-bottom flask was charged with a dibromodinaphthalenebenzene (488 mg, 1 mM), bis(1,5-cyclooctadiene)nickel(0) (312 mg, 2 mM), 2,2'-bipyridyl (550 mg, 2 mM) and 1,5-cyclooctadiene (245 µL, 2 mM). Anhydrous toluene (5 mL) was added to the flask, which was then purged with argon, followed by stirring under heating for 40 hours. The reaction mixture was returned to room temperature, and the resultant black solid was added dropwise to a mixture of methanol (100 mL) and 1N aqueous hydrochloric acid (100 mL), and the precipitates that formed were collected through filtration, to thereby obtain the black solid washed with methanol.

As a result of mass spectrometry, dinaphthalenebenzene, a dimer thereof and a trimer thereof were found to account for most of the product (yield amount: 309 mg, yield rate: 93%).

Example 4

The obtained polymers and various common solvents were used to prepare inks as described in the following Table 6.

Example 4-1

Each of the obtained inks was left to stand still in darkness at room temperature for 24 hours, and visually confirmed for stability over time (presence or absence of precipitates and decomposed matter, and change in color) as a solubility test, and evaluated according to the following evaluation criteria. The results are presented in Table 6.
—Evaluation Criteria—
A: The polymer was kept soluble even after one day passed and the state of the ink remained unchanged.
B: Although the polymer was soluble, the ink was colored or some of the polymer precipitated after one day passed.
C: The polymer was not soluble in the ink or there were precipitates in the ink.

Example 4-2

Each of the obtained inks was filtered with a chromatodisc (non-aqueous, 0.45 µm, product of GL Sciences Inc.) as an inkjet test and evaluated in terms of whether it could be discharged stably. Specifically, each ink was charged to a pulse injector (nozzle diameter: 25 µm, product of CLUSTER TECHNOLOGY CO., LTD.). Then, using WAVEBUILDER (product of CLUSTER TECHNOLOGY CO., LTD.) where the drive waveform, the number of discharges per sec, and the drive voltage were adjusted, the ink was tested in terms of whether it could be discharged stably for 5 min, and evaluated according to the following evaluation criteria. The results are presented in Table 6.

—Evaluation Criteria—
A: The ink could be discharged continuously for 5 min or more.
B: Although the ink could be discharged, the ink was variably and unstably discharged, or could not be discharged in the course of the test.
C: The ink could not be discharged.

Example 4-3

As a film-forming test, the obtained inks were spin-coated onto $UVO_3$-treated quartz substrates (10 mm×10 mm) and Si substrates (n-doped, oxide film, HMDS-treated, 10 mm×10 mm) at 1,000 rps, followed by vacuum drying to form organic films. Observation under an optical microscope and observation of the film in a state of being irradiated with UV rays of 365 nm confirmed that smooth films had been formed on the quartz substrates and the Si substrates. The results are presented in Table 6.

—Evaluation Criteria—
A: It was confirmed under an optical microscope that the resultant film was a smooth continuous film.
B: It was confirmed under an optical microscope that the resultant film was a discontinuous film.

TABLE 6

| | Polymer | Main solvent | Conc. (% by mass) | Ex. 4-1 Solubility test | Ex. 4-2 Discharging test | Ex. 4-3 Film formation test |
|---|---|---|---|---|---|---|
| Ink 1 | Polymer 1 | THF | 10 | A | B Unstable | A |
| Ink 2 | Polymer 1 | Mesitylene | 1 | A | A | A |
| Ink 3 | Polymer 1 | Xylene | 1 | A | A | A |
| Ink 4 | Polymer 1 | Ethyl benzoate | 1 | A | A | A |
| Ink 5 | Polymer 1 | Toluene | 1 | A | A | A |
| Ink 6 | Polymer 1 | Chloroform | 10 | A | B Unstable | A |
| Ink 7 | Polymer 2 | Toluene | 1 | A | A | A |
| Ink 8 | Polymer 3 | Toluene | 1 | A | A | A |
| Ink 9 | Polymer of Comp. Ex. | Toluene | 1 | C Precipitated | C Precipitated | B Discontinuous |
| Ink 10 | Polymer of Comp. Ex. | Toluene | 0.1 | B Opaque | A | B Discontinuous |

As is clear from the results, the comparative polymers not having the specific partial structure (Inks 9 and 10) could not form a good organic film due to low solubility, while the polymers of the present invention having the specific partial structure was improved in solubility and film-formability and could form good inks.

Example 5

Application Example 1

Figure 2:
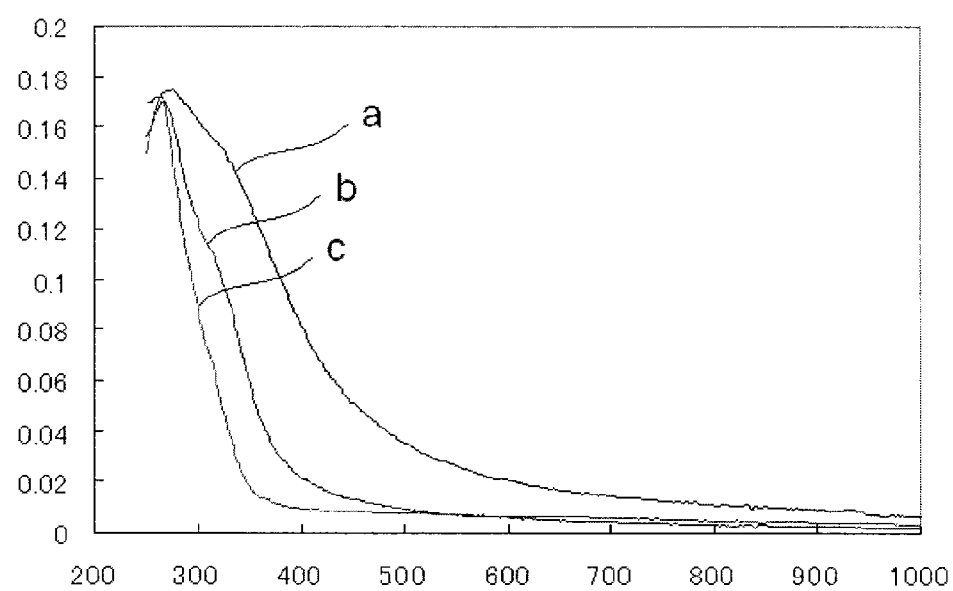
FIG. 2 is a UV-Vis absorption spectrum of an organic film obtained in Example 5.

Ink 1 was irradiated with excitation light at 365 nm. As a result, emission of blue light was observed.
Additionally, the organic films obtained in Example 4-3 (quartz substrate) were irradiated with excitation light at 365 nm. As a result, emission of blue light was observed. Similarly, emission of blue light was observed in the organic films obtained from Inks 7 and 8. FIG. 2 is a UV-Vis absorption spectrum of the polymer organic film obtained from Ink 7. In FIG. 2, reference character a indicates the spectrum of the polymer organic film that was not heated after the formation thereof; reference character b indicates the spectrum of the polymer organic film that was heated at 300° C. for 30 min after the formation thereof; and reference character c indicates the spectrum of the polymer organic film that was heated at 450° C. for 30 min after the formation thereof.

As described above, the polymer of the present invention was found to be useful as photoluminescence material.

Example 6

Ink 1 was spin-coated at 3,000 rpm onto a $UVO_3$-treated and HMDS-treated Si substrate (oxide film: 300 nm) to thereby obtain an organic film. The obtained organic film was heated with a hot plate at 80° C. for 30 min in a glove box. Source electrodes and drain electrodes having a channel width of 1,000 μm and a channel length of 50 μm (both are Ag electrodes, film thickness: 50 nm, back pressure: $4 \times 10^{-4}$ Pa) were formed on the organic film by vacuum deposition. Using semiconductor parameters, transfer property (SD voltage: −20 V, G voltage: +20 V to −20 V) and output property (SD voltage: −20 V, G voltage: 5 V step) were measured. As a result, the organic film of Example 6 was found to exhibit good p-type semiconducting property, where the mobility was $3 \times 10^{-4}$ cm$^2$/Vs and the ON/OFF ratio of on-state current to off-state current was $10^5$, indicating that the organic film of Example 6 is useful also as an organic film of an electronic device.

The polymer of the present invention can be molded in its solution form, and can provide promising functions and effects as materials for forming an insulating member, a semiconductor active layer, an electrode and a film-like material, as well as a luminescent and fluorescent material.

Aspects of the present invention are, for example, as follows.
<1> A polymer including;
a polyaryl backbone; and
an organic side-chain group containing a partial structure represented by the following General Formula (I) or (II);

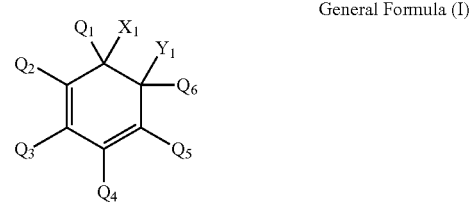

General Formula (I)

where in General Formula (I), one of $X_1$ and $Y_1$ represents an alkoxy group which may have a substituent, or an acyloxy group which may have a substituent, and the other represents a hydrogen atom; $Q_1$ to $Q_6$ each independently represent a hydrogen atom, a halogen atom, a monovalent organic group, or a bond to a carbon atom or a nitrogen atom in an adjacent aryl ring; and adjacent groups among $Q_1$ to $Q_6$ may be linked together to form a part of a ring or be annelated to an adjacent benzene ring,

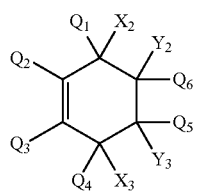

General Formula (II)

where in General Formula (II), one of $X_2$ and $Y_2$ represents an alkoxy group which may have a substituent, or an acyloxy group which may have a substituent, and the other represents a hydrogen atom; one of $X_3$ and $Y_3$ represents an alkoxy group which may have a substituent, or an acyloxy group which may have a substituent, and the other represents a hydrogen atom; $Q_1$ to $Q_6$ each independently represent a hydrogen atom, a halogen atom, a monovalent organic group, or a bond to a carbon atom or a nitrogen atom in an adjacent aryl ring; and adjacent groups among $Q_1$ to $Q_6$ may be linked together to form a part of a ring or be annelated to an adjacent benzene ring.

<2> The polymer according to <1>,
wherein the polyaryl backbone includes a polyphenylene structure.

<3> The polymer according to <2>,
wherein the polyphenylene structure is represented by the following General Formula (III):

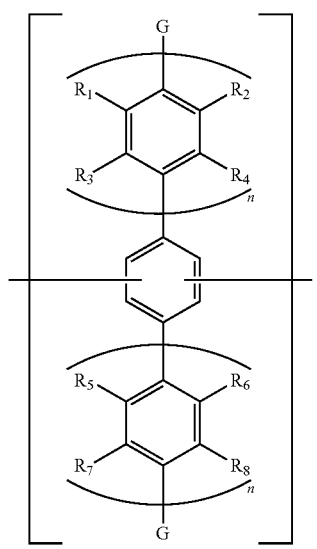

General Formula (III)

where in General Formula (III), n denotes a repeated number and is an integer of 0 to 5; $R_1$ to $R_8$ are each independently selected from a hydrogen group, a halogen atom, an alkyl group and an aryl group, provided that when n≥2, $R_1$ to $R_8$ may be the same or different; and G represents a group including a partial structure represented by General Formula (I) or (II).

<4> The polymer according to <3>,
wherein the polyphenylene structure is represented by General Formula (III-1):

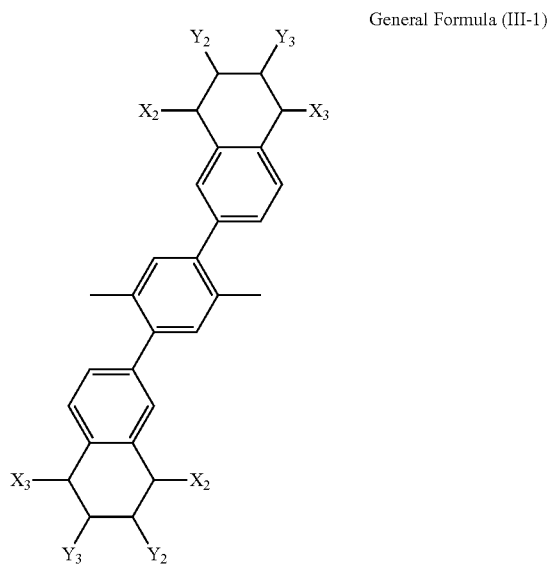

General Formula (III-1)

where in General Formula (III-1), one of $X_2$ and $Y_9$ represents an alkoxy group which may have a substituent, or an acyloxy group which may have a substituent, and the other represents a hydrogen atom; and one of $X_3$ and $Y_3$ represents an alkoxy group which may have a substituent, or an acyloxy group which may have a substituent, and the other represents a hydrogen atom.

<5> An ink including:
the polymer according to any one of <1> to <4>.
<6> An organic film including:
the polymer according to any one of <1> to <4>.
<7> An electronic device including:
the organic film according to <6>.
<8> The electronic device according to <7>,
wherein the electronic device is an electroluminescence element.
<9> The electronic device according to <7>,
wherein the electronic device is an organic transistor including the organic film as an active layer.

This application claims priority to Japanese application No. 2012-064760, filed on Mar. 22, 2012 and incorporated herein by reference.

What is claimed is:
1. A polymer comprising:
a polyaryl backbone comprising a polyphenylene structure; and
an organic side-chain group comprising a partial structure represented by General Formula (I) or (II):

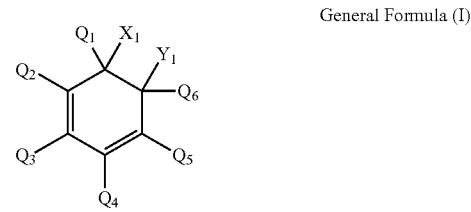

General Formula (I)

where in General Formula (I), one of $X_1$ and $Y_1$ represents an alkoxy group which may have a substituent, or an acyloxy group which may have a substituent, and the other represents a hydrogen atom; $Q_1$ to $Q_6$ each independently represent a hydrogen atom, a halogen atom, a monovalent organic group, or a bond to a carbon atom or a nitrogen atom in an adjacent aryl ring; and adjacent groups among $Q_1$ to $Q_6$ may be linked together to form a part of a ring or are optionally annelated to an adjacent benzene ring,

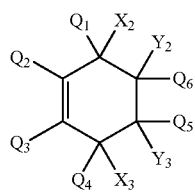

General Formula (II)

where in General Formula (II), one of $X_2$ and $Y_2$ represents an alkoxy group which may have a substituent, or an acyloxy group which may have a substituent, and the other represents a hydrogen atom; one of $X_3$ and $Y_3$ represents an alkoxy group which may have a substituent, or an acyloxy group which may have a substituent, and the other represents a hydrogen atom; $Q_1$ to $Q_6$ each independently represent a hydrogen atom, a halogen atom, a monovalent organic group, or a bond to a carbon atom or a nitrogen atom in an adjacent aryl ring; and adjacent groups among $Q_1$ to $Q_6$ may be linked together to form a part of a ring or are optionally annelated to an adjacent benzene ring.

2. The polymer according to claim 1,
wherein the polyphenylene structure is represented by General Formula (III):

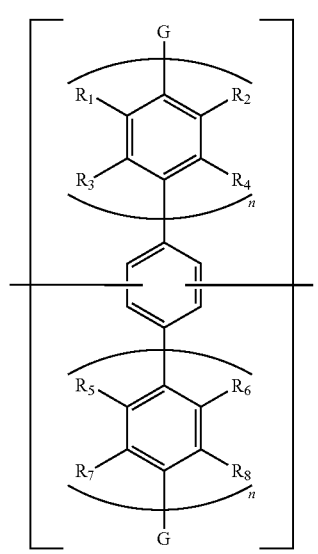

General Formula (III)

where in General Formula (III), n denotes a repeated number and is an integer of 0 to 5; $R_1$ to $R_8$ are each independently selected from a hydrogen group, a halogen atom, an alkyl group and an aryl group, provided that when n 2, $R_1$ to $R_8$ may be the same or different; and G represents a group comprising a partial structure represented by General Formula (I) or (II).

3. The polymer according to claim 2,
wherein the polyphenylene structure is represented by General Formula (III-1):

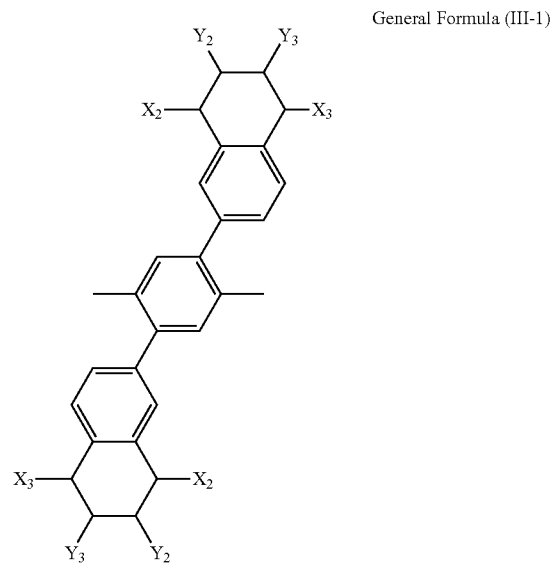

General Formula (III-1)

where in General Formula (III-1), one of $X_2$ and $Y_2$ represents an alkoxy group which may have a substituent, or an acyloxy group which may have a substituent, and the other represents a hydrogen atom; and one of $X_3$ and $Y_3$ represents an alkoxy group which may have a substituent, or an acyloxy group which may have a substituent, and the other represents a hydrogen atom.

4. An ink comprising:
a polymer,
wherein the polymer comprises:
a polyaryl backbone comprising a polyphenylene structure; and
an organic side-chain group comprising a partial structure represented by General Formula (I) or (II):

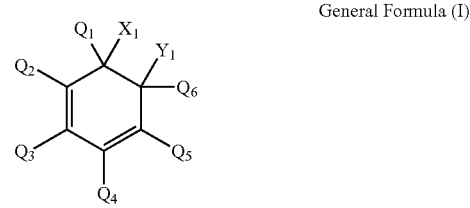

General Formula (I)

where in General Formula (I), one of $X_1$ and $Y_1$ represents an alkoxy group which may have a substituent, or an acyloxy group which may have a substituent, and the other represents a hydrogen atom; $Q_1$ to $Q_6$ each independently represent a hydrogen atom, a halogen atom, a monovalent organic group, or a bond to a carbon atom or a nitrogen atom in an adjacent aryl ring; and adjacent groups among $Q_1$ to $Q_6$ may be linked together to form a part of a ring or are optionally annelated to an adjacent benzene ring,

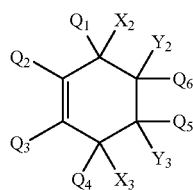

General Formula (II)

where in General Formula (II), one of $X_2$ and $Y_2$ represents an alkoxy group which may have a substituent, or an acyloxy group which may have a substituent, and the other represents a hydrogen atom; one of $X_3$ and $Y_3$ represents an alkoxy group which may have a substituent, or an acyloxy group which may have a substituent, and the other represents a hydrogen atom; $Q_1$ to $Q_6$ each independently represent a hydrogen atom, a halogen atom, a monovalent organic group, or a bond to a carbon atom or a nitrogen atom in an adjacent aryl ring; and adjacent groups among $Q_1$ to $Q_6$ may be linked together to form a part of a ring or are optionally annelated to an adjacent benzene ring.

5. An organic film comprising:

a polymer, wherein the polymer comprises:

a polyaryl backbone comprising a polyphenylene structure; and an organic side-chain group comprising a partial structure represented by General Formula (I) or (II):

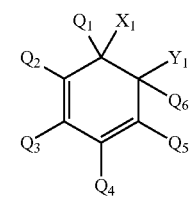

General Formula (I)

where in General Formula (I), one of $X_1$ and $Y_1$ represents an alkoxy group which may have a substituent, or an acyloxy group which may have a substituent, and the other represents a hydrogen atom; $Q_1$ to $Q_6$ each independently represent a hydrogen atom, a halogen atom, a monovalent organic group, or a bond to a carbon atom or a nitrogen atom in an adjacent aryl ring; and adjacent groups among $Q_1$ to $Q_6$ may be linked together to form a part of a ring or are optionally annelated to an adjacent benzene ring,

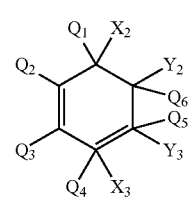

General Formula (II)

where in General Formula (II), one of $X_2$ and $Y_2$ represents an alkoxy group which may have a substituent, or an acyloxy group which may have a substituent, and the other represents a hydrogen atom; one of $X_3$ and $Y_3$ represents an alkoxy group which may have a substituent, or an acyloxy group which may have a substituent, and the other represents a hydrogen atom; $Q_1$ to $Q_6$ each independently represent a hydrogen atom, a halogen atom, a monovalent organic group, or a bond to a carbon atom or a nitrogen atom in an adjacent aryl ring; and adjacent groups among $Q_1$ to $Q_6$ may be linked together to form a part of a ring or are optionally annelated to an adjacent benzene ring.

6. The ink according to claim 4, wherein the polyphenylene structure is represented by General Formula (III):

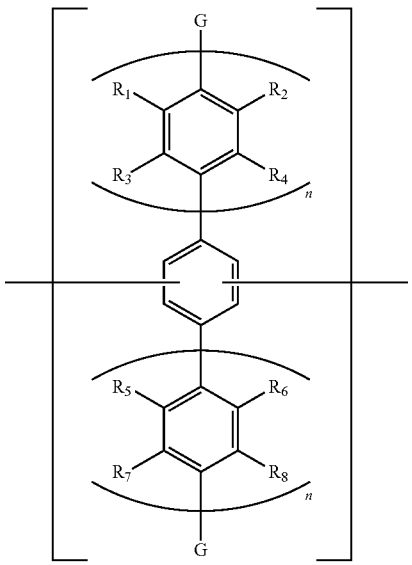

General Formula (III)

where in General Formula (III), n denotes a repeated number and is an integer of 0 to 5; $R_1$ to $R_8$ are each independently selected from a hydrogen group, a halogen atom, an alkyl group and an aryl group, provided that when n 2, $R_1$ to $R_8$ may be the same or different; and G represents a group comprising a partial structure represented by General Formula (I) or (II).

7. The ink according to claim 6, wherein the polyphenylene structure is represented by General Formula (III-1):

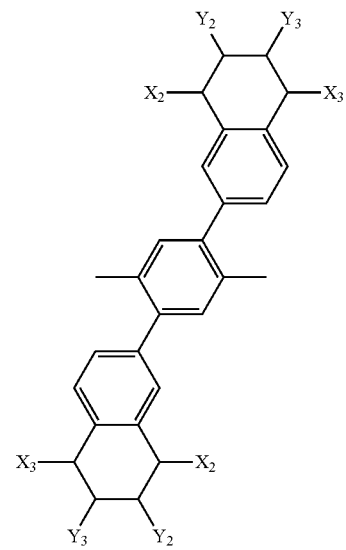

General Formula (III-1)

where in General Formula (III-1), one of $X_2$ and $Y_2$ represents an alkoxy group which may have a substituent, or an acyloxy group which may have a substituent, and the other represents a hydrogen atom; and one of $X_3$ and $Y_3$ represents an alkoxy group which may have a substituent, or an acyloxy group which may have a substituent, and the other represents a hydrogen atom.

8. The ink according to claim 4, further comprising a solvent which is an aromatic solvent, a halogenated solvent, an ether solvent or any combination thereof.

9. The ink according to claim 8, further comprising a viscosity adjusting liquid which is an alcohol solution, a ketone solution, a paraffin solvent, a solution of an alkyl-substituted aromatic compound having 4 or more carbon atoms, or any combination thereof.

10. The organic film according to claim 5,
wherein the polyphenylene structure is represented by General Formula (III):

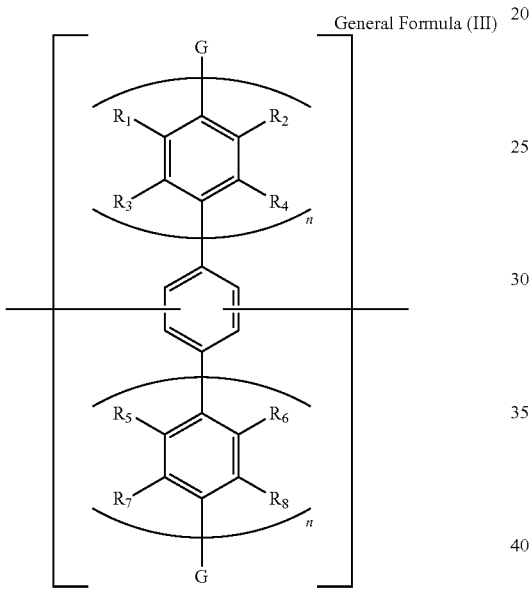

General Formula (III)

where in General Formula (III), n denotes a repeated number and is an integer of 0 to 5; $R_1$ to $R_8$ are independently selected from a hydrogen group, a halogen atom, an alkyl group and an aryl group, provided that when $n \geq 2$, $R_1$ to $R_8$ may be the same or different; and G represents a group comprising a partial structure represented by General Formula (I) or (II).

11. The organic film according to claim 10,
wherein the polyphenylene structure is represented by General Formula (III-1):

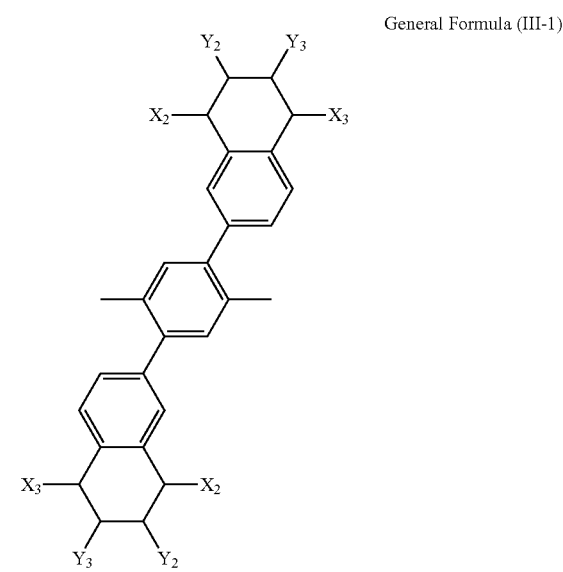

General Formula (III-1)

where in General Formula (III-1), one of $X_2$ and $Y_2$ represents an alkoxy group which may have a substituent, or an acyloxy group which may have a substituent, and the other represents a hydrogen atom; and one of $X_3$ and $Y_3$ represents an alkoxy group which may have a substituent, or an acyloxy group which may have a substituent, and the other represents a hydrogen atom.

\* \* \* \* \*